US011945036B2

(12) United States Patent
Halvorsen et al.

(10) Patent No.: US 11,945,036 B2
(45) Date of Patent: Apr. 2, 2024

(54) MOBILE ROBOTIC DRILLING APPARATUS AND METHOD FOR DRILLING CEILINGS AND WALLS

(71) Applicant: HILTI CORPORATION, Schaan (LI)

(72) Inventors: Havard Halvorsen, Sogndal (NO); Tom Asle Henninge, Oslo (NO); Konrad Fagertun, Oslo (NO)

(73) Assignee: HILTI CORPORATION, Schaan (LI)

( * ) Notice: Subject to any disclaimer, the term of this patent is extended or adjusted under 35 U.S.C. 154(b) by 288 days.

(21) Appl. No.: 17/410,037

(22) Filed: Aug. 24, 2021

(65) Prior Publication Data
US 2022/0001461 A1 Jan. 6, 2022

Related U.S. Application Data

(62) Division of application No. 15/522,951, filed as application No. PCT/EP2015/074815 on Oct. 27, 2015.

(30) Foreign Application Priority Data

Oct. 28, 2014 (GB) ...................................... 1419182

(51) Int. Cl.
B23B 39/14 (2006.01)
B23B 39/08 (2006.01)
(Continued)

(52) U.S. Cl.
CPC .............. *B23B 39/14* (2013.01); *B23B 39/08* (2013.01); *B25H 1/0035* (2013.01); *B08B 15/04* (2013.01);
(Continued)

(58) Field of Classification Search
CPC ........... B23B 39/08; B23B 39/14; B25H 1/00; B25H 1/0035; B66F 7/0666; Y10T 408/93; Y10T 408/935; Y10S 408/712
See application file for complete search history.

(56) References Cited

U.S. PATENT DOCUMENTS 1,674,669 A * 6/1928 Percy ................. B23Q 11/0028
470/96
4,586,856 A * 5/1986 Waber .................. B25H 1/0021
408/92
(Continued)

FOREIGN PATENT DOCUMENTS

CN 201242438 Y * 5/2009
DE 29919442 U1 * 1/2000 ........... B24B 23/005
(Continued)

OTHER PUBLICATIONS

Examination Report issued by the New Zealand Patent Office dated May 19, 2022.
(Continued)

*Primary Examiner* — Eric A. Gates
(74) *Attorney, Agent, or Firm* — BACON & THOMAS, PLLC

(57) ABSTRACT

A robotic drilling apparatus is described which has been adapted for drilling holes in ceilings and walls on a construction site. The apparatus (100) comprises a robotic arm (110) mounted to a substructure (112), the substructure comprising a lifting mechanism arranged to lift the robotic arm to a working position, wherein the robotic arm has a base end (110a) and a movable end (110b), the base end being mounted to an upper surface (114) of the lifting mechanism and the movable end being capable of movement with respect to the base end in a three dimensional space, wherein the robotic drilling apparatus further comprises a mount (120) provided on the movable end for
(Continued)

holding a drilling device (122) and a control unit (134) for controlling the operation of the robotic arm. The lifting mechanism preferably comprises a scissor-jack lifting platform. The robotic arm (110) and any support structure (134) for the robotic arm weighs less than 43 kg, and preferably individually weigh less than 23 kg.

20 Claims, 15 Drawing Sheets

(51) Int. Cl.
    *B25H 1/00*     (2006.01)
    *B08B 15/04*     (2006.01)
    *B66F 7/06*     (2006.01)

(52) U.S. Cl.
    CPC ......... *B66F 7/0666* (2013.01); *Y10S 408/712* (2013.01); *Y10T 408/935* (2015.01)

(56) References Cited

U.S. PATENT DOCUMENTS

| | | | | |
|---|---|---|---|---|
| 4,915,549 | A * | 4/1990 | Riddell | B23B 39/16 408/46 |
| 5,356,245 | A | 10/1994 | Hosoi et al. | |
| 5,743,705 | A * | 4/1998 | Eissfeller | B23Q 1/48 901/16 |
| 5,971,677 | A * | 10/1999 | Lan | B25J 9/1065 408/237 |
| 7,178,612 | B2 * | 2/2007 | Belik | E21B 19/165 166/85.1 |
| 7,643,923 | B2 * | 1/2010 | Buehlmann | E01C 19/006 701/50 |
| 9,370,827 | B2 * | 6/2016 | Zubin | F02C 7/045 |
| 9,817,922 | B2 * | 11/2017 | Glunz | G06T 17/00 |

FOREIGN PATENT DOCUMENTS

| | | | | |
|---|---|---|---|---|
| DE | 602004000620 | T2 * | 2/2007 | ............. E21B 7/025 |
| FR | 2894860 | A1 * | 6/2007 | ........... B24B 23/005 |
| JP | 1986-111892 | | 5/1985 | |
| JP | H0465631 | A * | 3/1992 | |
| JP | H 0483059 | A | 3/1992 | |
| JP | 1994031589 | A | 2/1994 | |
| JP | H0631514 | | 2/1994 | |
| JP | H0647609 | A | 2/1994 | |
| JP | 1994-179108 | | 6/1994 | |
| JP | H 06238605 | A | 8/1994 | |
| JP | 1996155787 | A | 6/1996 | |
| JP | H 09300114 | A | 11/1997 | |
| JP | 1998-205268 | | 8/1998 | |
| JP | 2002/131056 | A | 5/2002 | |
| JP | 2006/058153 | A | 3/2006 | |
| JP | 2011501105 | A * | 1/2011 | |

OTHER PUBLICATIONS

Steve Crowe et al., "nLink Mobile Drilling Robot Wins Robobusiness Pitchfire Startup Contest—Robotics Bussiness Review", Robotics Bussiness Review, Oct. 15, 2014, URL: http://www.roboticsbusinessreview.com/article/nlink mobile drilling robot wins robobusiness pitchifre startup contest/.

Examination Report in corresponding New Zealand application, dated Dec. 10, 2021.

Shih-Chung Kang et al: Editorial on Robotics in Building and Infrastructure, International Journal of Advanced Robotic Systems, Jan. 1, 2014.

Official Action dated Aug. 29, 22 in corresponding Japanese Appln. No. 2022-088055.

Sletvold et al., Project Report entitled "Prosjektrapport BIM og Robotteknologi," May 26, 2014.

Steve Crowe et al.; "nLink Mobile Drilling Robot Wins RobobusinessPitchfire Startup Contest," Robotics Business Review, Research Report Advanced Manufacturing Newsletter; dated Jan. 25, 2016, pp. 1-7; cited in International Search Report of corr. PCT Appl. No. PCT/EP2015/074815.

Halvard Sletvold et al., "Avsluttende Case BIM2001," Prosjektrapport BIM og robottecknologi; dated May 26, 2014; pp. 1-56; cited in International Search Report of corr. PCT Appl. No. PCT/EP2015/074815.

Office Action dated Feb. 7, 2023 (Decision of Refusal) cited in corresponding Japanese Application 2022-088055.

* cited by examiner

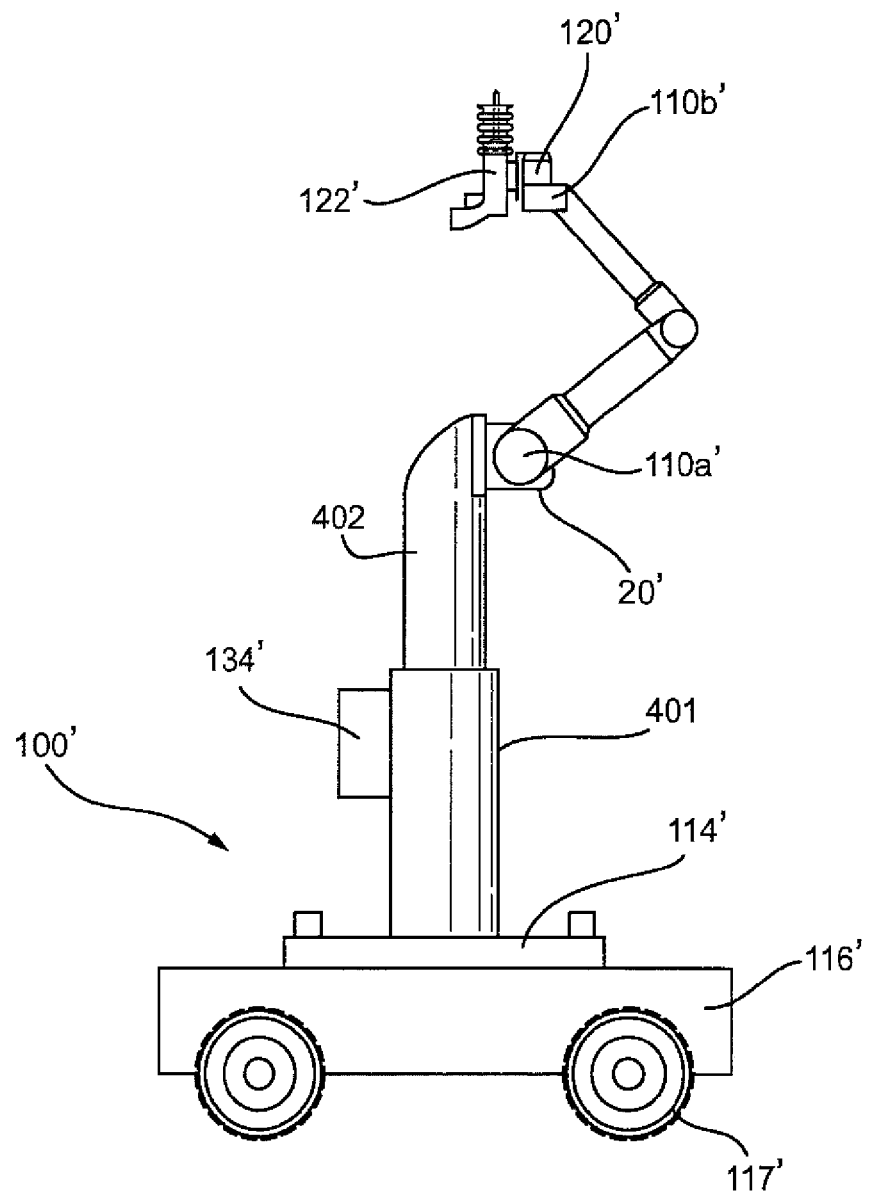

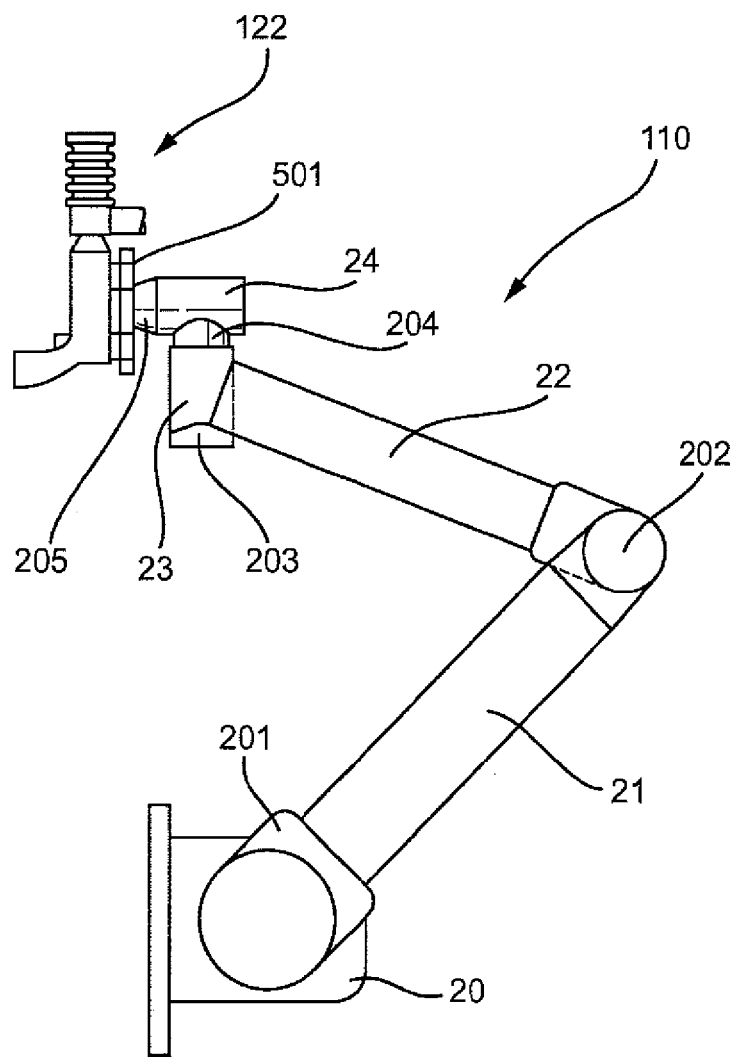

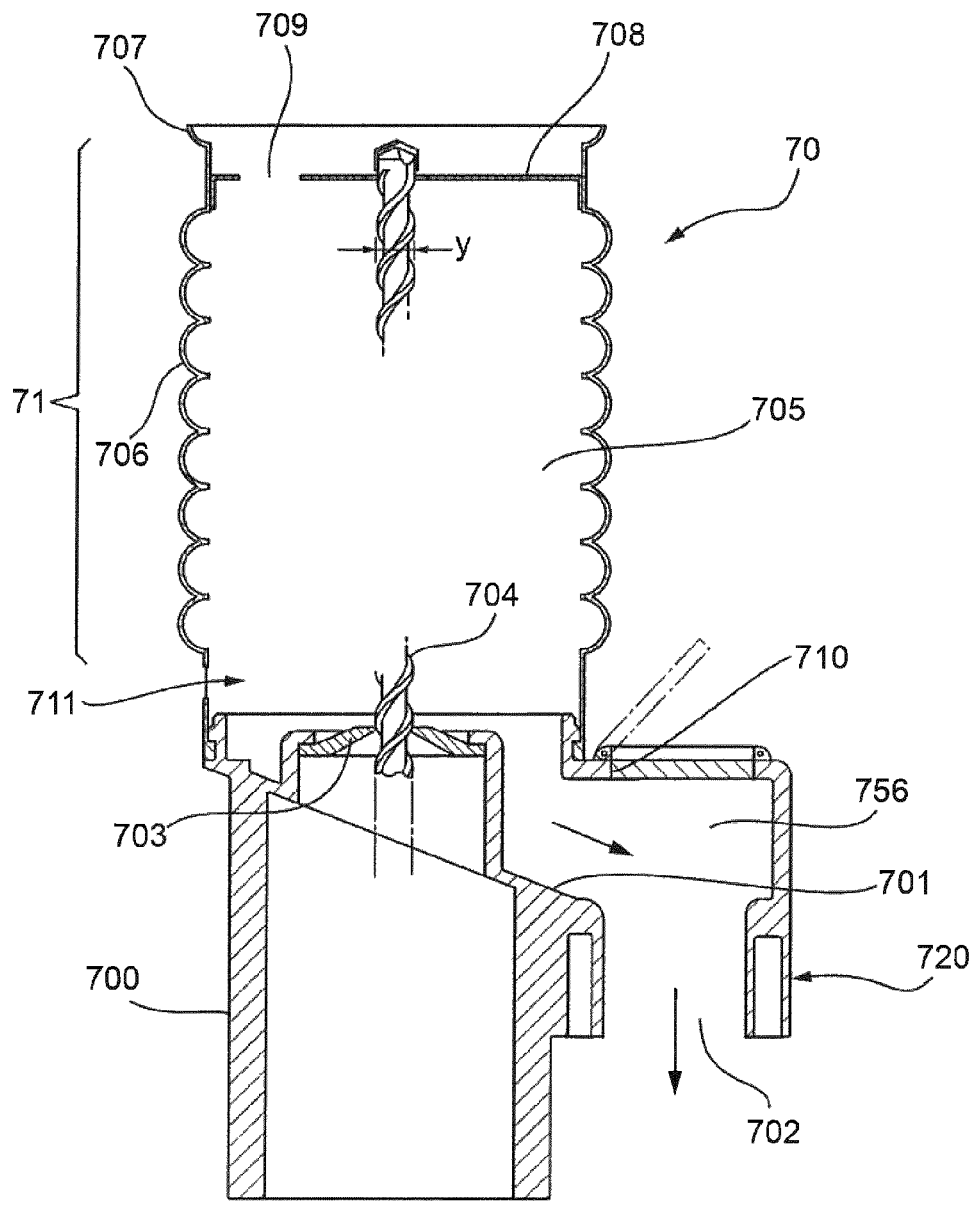

MOBILE ROBOTIC DRILLING APPARATUS AND METHOD FOR DRILLING CEILINGS AND WALLS

TECHNICAL FIELD

The present invention relates to a mobile robotic drilling apparatus for drilling ceilings and walls, as well as to a method of drilling using the apparatus. It further relates to a vibration reducing assembly and to a mobile robotic drilling apparatus employing the same.

BACKGROUND

During construction of a building, particularly a large building such as a new office space, a shopping mall, etc., a considerable amount of labour is expended during the measuring up of surfaces, in particular ceilings and walls, and the subsequent drilling of holes for the mounting of components and building infrastructure, such as for wiring, pipes for water and waste, heating/cooling fluids, conduits for air conditioning, and of course equipment like pumps, controllers etc. associated with those services. This list is, of course, by no means exhaustive of the possibilities.

By the very nature of drilling holes in ceilings in particular, it is a difficult operation with the workman usually having to stand on a ladder or platform to reach the drilling points, and then lift heavy drilling equipment above his or her head. The work usually creates high levels of dust and there will be minimum health and safety requirements that the workman will have to adhere to, such as ear, eye and breathing protection.

The marking up process in particular is very time consuming and the eventual positioning of the drilled holes, their depths and accuracy of drilling angle, is all subject to the workman's skill.

Nowadays, the workman will be working from plans that have been previously prepared on a computer as an electronic model. As the processing power of computers has increased, the detail that is being incorporated into the electronic building information model (a so-called "BIM" file) has increased too, so that these BIM files may now also specify the model of the product or component that is intended to be mounted on the surface.

Difficulties associated with drilling holes in ceilings, in particular, concrete ceilings, have long been recognised and several attempts have been made to make life easier for the workmen tasked with this job.

When drilling, one of the main problems is the creation of noise and dust, which can make the harsh environment of the construction site even more demanding. Dust collecting collars or shrouds, usually connected to a vacuum source, are available and have been successful for reducing some of the negative effects of the dust that is produced as a direct result of the work being conducted, e.g. drilling into concrete.

One difficulty of using power tools such as rotary hammers, is their weight, making them cumbersome to handle over time, especially when it comes to overhead work. Unfortunately, although the known collars or surrounds may solve the issues related to dust, they can also add significant weight to the boring systems.

Another problem with power tools like rotary hammers, is the significant amount of vibration that is generated during operation of the tool.

The prior art shows multiple examples of vibration damping technology being used with power tools, either as attachments or embedded in the original design. This is especially common for rotary hammers, for example rotary drill or percussive devices that rely on direct coaxial energy transfer into the workpiece, and which in turn benefit from such vibration damping functionality. In the construction industry where there is a widespread use of such power tools, the prior art damping solutions usually utilize a counterweight to limit the vibrations being transferred to the hand/arm of the worker, or to the machinery holding and controlling the tool.

Further documents describe devices for fastening power tools, such as a rotary hammer, in relation to a workpiece. When working on a large and solid workpiece, this fastening may be achieved by means of vacuum, which allows for effective clamping of the tool or tool jig to the surface without leaving permanent marks.

WO-A-2001/068300 describes a system for clamping, boring and removing debris, and goes into detail explaining the use of pneumatics for all of these actions. It comprises a drilling apparatus that is in the form of a drill stand and mounted on a trolley for positioning under where it is desired to drill the holes. The negative pressure within the dust collection shroud is not only to remove the debris but also to apply a controlled amount of pressure on the drill as the holes are being drilled in the workpiece.

Although working well in theory, such mobile manipulators are normally heavy and cumbersome themselves. There is a need in the construction industry for lightweight devices with similar features of the device described in WO-A-2001/068300 that can be mounted to conventional rotary hammers and such without adding a lot of weight, thus allowing them to be used effortlessly by human workers.

SUMMARY OF THE INVENTION

According to a first broad aspect, the present invention can be seen to provide a robotic drilling apparatus that is configured for drilling holes in a ceiling or wall on a building construction site.

The present invention can also be seen to provide a method of drilling holes in a ceiling or a wall on a building construction site comprising providing a robotic drilling apparatus comprising a robotic arm and a drilling device and a control unit, installing instructions in a memory of the control unit for executing a set of drilling operations, setting a first location, activating a drilling operation stored in the memory to cause the robotic arm to execute a set of controlled movements that manoeuvre the drilling device and drill a pattern of holes in a ceiling or wall in accordance with the installed instructions.

The present invention can also be seen to provide a computer program product which, when loaded onto a processor of a control unit for a robotic drilling apparatus, can determine a sequence of movements for a robotic arm to execute in order to manoeuvre a drilling device into positions to drill a pattern of holes in a ceiling or wall on a construction site. The computer program product may be further configured to access a BIM file in respect of the ceiling or wall as part of the determining. It may also determine a schedule of works for a building, determining an order for drilling the holes prescribed in the BIM file. It may further determine one or more locations for positioning the robotic drilling apparatus in the building before a drilling operation is commenced.

According to one broad aspect, there is also provided a robotic drilling apparatus which has been adapted for drilling holes in ceilings and walls, e.g., on a construction site.

The apparatus may comprise: a robotic arm having a base end and a movable end, the movable end being capable of movement with respect to the base end in a three dimensional space; a substructure comprising a lifting mechanism to which the base end of the robotic arm is fixed, the lifting mechanism being arranged to lift the robotic arm to a working height; a mount provided on the movable end of the robotic arm for holding a drilling device in a configuration for drilling a hole in a ceiling or wall; and a control unit for controlling the operation of the robotic arm.

One advantage of the robotic drilling apparatus is that the lifting mechanism allows for a relatively compact and lightweight robotic arm to be used, while still allowing for a normal full ceiling height to be reached with ease by the drilling device (even in the case of a commercial unit prior to fitting of a false ceiling). While the substructure may be reasonably heavy, by comparison the robotic arm and any support structure (for example, a cabinet comprising the control unit and ancillaries for the robotic arm), may be sufficiently lightweight to be fitted to the substructure by just two people, or in preferred case by just one person.

BRIEF DESCRIPTION OF CERTAIN OPTIONAL FEATURES

The following is a brief description of certain exemplary features which are optional to the present invention.

As mentioned above, the apparatus may comprise a robotic arm and a substructure for lifting the robotic arm to a working height. In preferred embodiments, the substructure is motorised and may comprise a scissor-jack lifting platform (a scissor lift). Such platforms can provide a relatively stable base for the robotic arm even when it is raised to a high elevated position. Narrow scissor lifts are available which can pass through doorways. In combination, these components (the motorised substructure and robotic arm) can be maneuvered around a construction site by a single operator with relative ease.

The robotic arm may be one having six degrees of freedom to allow it to move a drilling device freely within a three dimensional space as well as controlling the orientation of the drilling device within that space.

The robotic arm may be a currently available robot made of lightweight materials, such as stiff plastics, composite materials and lightweight alloys. The robotic arm may have a reach of only up to 2 m, or more preferably less, for example, around 1 to 1.5 m. It will need to be sufficiently strong to lift a drilling device and to exert sufficient force against the drill tip to drill the hole and preferably cause a hammer action without distortion. An upward force of greater than 50 N may be required, preferably greater than 100 N (for example 100 N to 200 N). However, it does not need to be an industrial machine robot with capabilities of handling significantly larger loads. Through being lifted up to a working height by the substructure, a much more manageable robot can be used in the present invention.

Preferably the control unit is programmed so that the robotic arm, once positioned under the region where it is desired to drill a set of holes, can proceed to drill all the holes of that set autonomously and without the further intervention of the operator. As such, the depth and orientation of the drilled holes can be controlled with a good level of precision. Also, in contrast to the known drill stands that have to be moved after each hole, the position of each hole in the set or pattern can be set accurately with respect to the first drilled hole or a reference mark, and the robotic arm can then reach a set of positions without the need to reposition the robotic drilling apparatus. More importantly, this may avoid the need, or at least reduce the need, to mark up all the holes beforehand.

Preferably the robotic drilling apparatus includes a location guidance system, for example, a laser guidance system. In this way, the apparatus can guide itself or manoeuvre itself with respect to a set of coordinates which are set relative to the building. This allows the holes to be drilled accurately according to the architect's plans. It can avoid the need for the laborious steps of marking out the hole positions prior to starting the drilling operation.

The robotic drilling apparatus may include an electronic measuring device such as a total laser station, preferably a free-standing conventional total laser station, that is interfaced with the control unit which controls the operation of the robotic arm (and preferably also the substructure), so that it is able to determine measurements for the room or building and assess its position within the room with a high degree of accuracy.

Indeed, preferably the control unit of the robotic drilling apparatus receives or is able to access a BIM file (or relevant section thereof), so that the robotic drilling apparatus is working exactly to the architect's plans. With the preferred addition of an electronic measuring device and a laser guidance system, the robotic drilling apparatus can not only work to the architect's plans but do so with high levels of accuracy.

The control unit may be programmed with software which can recognise a code used to indicate a proposed component or assembly stipulated in the BIM file. This might be, for example, an alphanumeric code, a bar code or a link to a further file. The control unit may be programmed to reference a library file for that component or assembly, and then to calculate a set of drilling points based on information gathered from the library file. In this way, the exact drilling points for the component or assembly do not need to be indicated in the BIM file but rather a code to indicate the intended component or assembly.

The control unit may analyse the BIM file to determine a schedule of works for the building. For example, it may determine an order for a set of drilling operations based on location (for example the region of the building or the room) or based on type of hole (for example size of hole required or material being drilled). In this way it may be possible to minimise drilling time. The control unit may further determine optimum locations for the robotic drilling apparatus based on the schedule of works which minimise the amount of repositioning required. It may further convey this information to the operator on a display and may further determine and suggest working heights that allow the larger areas to be drilled more efficiently.

Traditionally on a construction site, workmen for each of the various trades would come and mark out a set of holes just for mounting their own components or assemblies. For example, an electrician would mark out holes for the wiring before installing the electrical circuits, the IT specialist would mark out holes for the data systems, the air conditioning installer would mark out holes for the air conditioning conduits, etc.

One advantage of the robotic drilling apparatus is that as a result of the control unit either accessing or receiving a section of the BIM file, it can determine all the holes which need to be drilled within a particular region of the ceiling or wall for a collection of or all of the trades specified within the BIM file.

Thus in such preferred arrangements, no marking out is required; instead an electronic file is generated holding all the locations and particulars of the holes for all of the trades. The robotic drilling apparatus can then be instructed to commence and drill all the holes in one drilling sequence, so that they are all pre-prepared and ready for the various workmen when they arrive on the construction site in order to attach the particular components or assemblies.

The robotic drilling device may include a bank of different sized drills that the drilling device can select from as required. It may also include a tool that can colour code the holes, e.g. with paint or other marker, to indicate to the various workmen which drilled hole is for who.

The drilling apparatus may also be provided with a device for inserting a plug into each hole, so that the drilled holes are completely ready for receiving a fastener, for example, a screw or a bolt. The colour of the plugs may be chosen to indicate the product or trade of workman that the hole has been drilled for. The plugs may include some other shape or marking to indicate the product or trade.

Thus the new robotic drilling apparatus, at least in such preferred embodiments, is able to be positioned within a construction site, programmed with at least a section of the BIM file, and upon instructions from an operator, execute a sequence of drilling operations autonomously to drill some or all of the holes intended for that area, in accordance with the information in the BIM file. Further it may finish the holes off with a colour code, plug or some other finish as prescribed by the BIM file. The BIM file may include details of the colour code or other mark (e.g., it may specify which colour of plugs is required for which fasteners).

In this way, problems associated with one tradesman wrongly positioning a component and/or obstructing access to an intended drilling site for another tradesman can be avoided. The subsequent tradesmen therefore do not have to work around the other components to prepare the holes; they merely have to come in to fix the components in place according to the BIM file. It may be possible as a result to position some of the components closer together. It also significantly reduces the amount of time the particular workman is on site, thereby reducing potential liabilities of the developer and, most significantly, reducing costs through the saved man hours.

With the addition of an electronic measuring device, such as a total laser station, the robotic drilling apparatus can also collect information of any inaccuracies of the physical building compared to the virtual building, e.g., where the measured differences are different to the theoretical ones. In preferred embodiments, the robotic drilling apparatus may produce an updated BIM file taking into account the dimensions of the physical building, which in turn may be conveyed back to the architect. Thus the robotic drilling apparatus may also function to survey and update the BIM file. In some situations it may even need to suggest modifications to the arrangement and position of the intended components and assemblies in order to take account of the physical dimensions of the building rather than the virtual dimensions.

Preferably the robotic drilling apparatus comprises an assembly configured to reduce the transmission of vibrations resulting from the drilling. For example, the assembly may reduce the transmission by 50% or more (i.e., the amplitude of the vibration is reduced by half).

In preferred arrangements the vibration reducing assembly comprises a shroud fitted to the drilling device, e.g., around where a drill bit extends from a chuck. The shroud may be connected to a vacuum device, and may be used to collect dust and debris produced from drilling the holes. The low pressure created within the shroud from the suction may act to reduce the amplitude of the vibrations. This can reduce the amount of noise transmitted, which can be particularly advantageous where refurbishments are being made to an existing building where people are still resident.

Furthermore the suction within the shroud may act to reduce the load felt by the robotic arm by creating an upwards force or thrust that can counteract some or all of the weight of the drilling device and/or robotic arm.

The amount of suction may be controlled through the adjustment of a valve that leaks air into the shroud or vacuum line. This may assist with the hole drilling, for example, by increasing the amount of suction initially, and hence exerting a greater amount of upthrust initially, it may assist the drill bit to break through the surface of the workpiece. Then it may be desirable to reduce the amount of suction to exert a smaller amount of upthrust as the hole progresses. The valve may be positioned on the shroud or further down the vacuum line. The amount of suction may also be controlled by controlling the output of the vacuum device.

Preferably the shroud extends further relative to the drill bit than a conventional dust shroud would, beyond the tip of the drill bit. As the drilling is being performed by a robot that already knows the location of the hole, visually obscuring the tip of the drill bit does not create a problem. The extra height of the shroud allows a full level of suction to be generated before the drill bit contacts the workpiece. This may help to assist with applying an upwards thrust on the drill bit right from the start of the drilling operation. The suction can also help to reduce any tendency for the drill bit to skid on the surface of the workpiece, thereby improving the accuracy of the hole. In addition it ensures as much of the dust and debris can be collected as possible.

The vibration reducing assembly may also comprise a mount that is adapted to minimise transmission of vibrations from the drilling device to the robotic arm. In preferred embodiments it may comprise a suspension system that allows sufficient travel to accommodate the amplitude of the vibrations. In this way the vibrations produced while drilling can be isolated or at least reduced at the mount before they are transmitted to the robotic arm.

The suspension system may comprise one or more rods or rails that are arranged to slide within bushes, preferably in a direction parallel to the axis of the drill bit. One side of the suspension system may comprise a plate for mounting to the moveable end of the robotic arm; the other side of the suspension system may comprise a plate with formations to provide a seat for the drilling device. The suspension system may include one or more biasing devices to return the mount to a neutral position.

Together, using a mount with a suspension system to reduce the transmission of vibrations and a shroud to reduce the forces felt by the robotic arm, significantly improves the operation of the robot, by reducing the type and size of the vibrations that may cause the robot to enter a safety shutoff mode. It can also reduce the harmful vibrations that create wear on the joints of the robotic arm. Furthermore a lighter weight or less substantial robotic arm may be used than might have been thought possible, because of the reduction in loads and vibration. This in turn facilitates easier handling by the operator because of the lighter weight and reduces problems when the robotic arm is stretching out beyond the footprint of the substructure.

The suspension system decouples the drill from the robotic arm to a certain degree. In order to measure the exact position of the drilling device, the suspension system is equipped with a linear position sensor that continuously monitors the linear position of the drill relative to the robotic arm along the drill axis. The linear displacement is limited by the technical properties of the suspension system. By taking into account the physical properties of the springs used in the system the linear position sensor can be used to measure the force acting between the robotic arm and drill along the drill axis.

The system software will hence have continuous control over the drill position relative to the robot. When the system detects that the linear position is close to the maximum allowed travel from the equilibrium, the system can move the robot along the drill axis to counteract for this displacement. This allows for a design of the suspension system with limited linear travel, without limiting the actual depth of a hole to be drilled. The robotic drilling apparatus may include features to try to prevent or minimise the effects of sway in the lifting mechanism. For example, it may be provided with one or more jacks that can exert a force against the ceiling. The jack may push from the upper surface of the lifting mechanism or it may be part of a floor-to-ceiling mechanism. One or more jacks may be provided towards the base of the lifting mechanism to remove sway through deflection of the wheels, track or other mechanism used to manoeuvre the drilling apparatus as the robotic arm extends to one side.

The robotic drilling apparatus may also include an inertial measurement unit (IMU) which provides feedback measurements to the robot server. The feedback measurements may be used to generate a compensation in terms of a displacement and rotation of the drill to account for an amount of sway detected by the IMU. One or more reflector prisms may also be mounted on the robotic arm and/or lifting mechanism, and measurements from a total laser station may be used (in addition to or in place of the IMU measurements) to provide position feedback measurements to the robot server for a sway compensation to be determined.

In this way, accurate drilling can be achieved even when the robotic arm is reaching to long distances on a conventional lifting mechanism, such as a scissor jack. While scissor jacks are familiar pieces of equipment on construction sites that workmen will be used to operating, they are not intended to be precision apparatus.

BRIEF DESCRIPTION OF THE DRAWINGS

Certain preferred embodiments of the present invention will now be described in greater detail by way of example only and with reference to the accompanying figures, in which:

FIG. 4 shows a further exemplary robotic drilling apparatus having similar drilling functionality to that shown in FIG. 1;

FIG. 5 shows a view of a robotic drilling arm with a drilling device attached to a mount;

FIGS. 7a and 7b show a cross-sections through preferred shrouds for use as part of a vibration reducing assembly in accordance with another aspect of the present invention;

DETAILED DESCRIPTION

Figure 1:
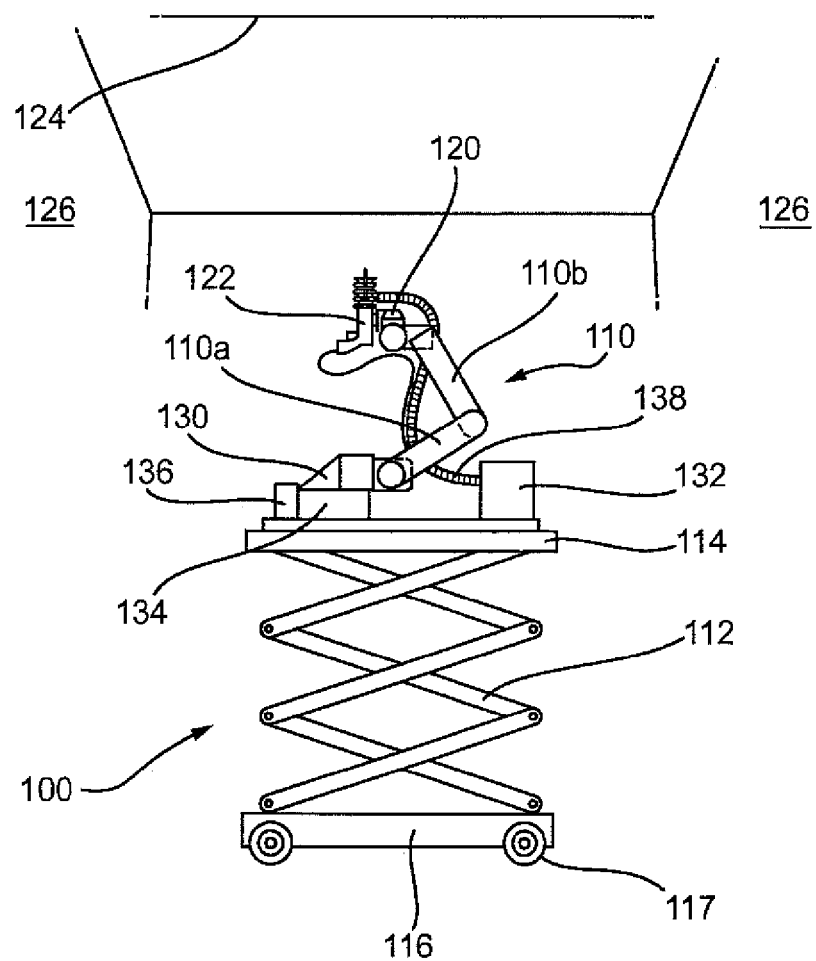
FIG. 1 shows an exemplary robotic drilling apparatus in accordance with one aspect of the present invention.

One aspect of a preferred embodiment of the present invention is shown generally in FIG. 1.

In this embodiment, there is provided a robotic drilling apparatus 100 having a robotic arm 110, with one end (a base end 110a) mounted to a substructure 112 and a moveable end 110b of the robotic arm 110 connected to a mount 120 for holding a drilling device 122.

A processor, not shown, can control the movement of the robotic arm 110 and the substructure 112 in order to manoeuvre the drilling device 122 to drill into a ceiling 124 or wall 126. For example, the height of the substructure 112 can be adjusted to move the drilling device 122 in a vertical direction towards a ceiling 124 or to a specific height on a wall 126. The robotic arm 110 can also be adjusted along various axes to position, orientate and move the drilling device 122 with respect to a ceiling or wall for drilling holes therein.

As shown in FIG. 1, the robotic arm 110 may be mounted on the substructure 112 via a support structure 130. The support structure 130 may be attached or fixed to the substructure 112 preferably through the use of fasteners such as bolts or a quick release coupling system. In the preferred embodiment shown, the support structure 130 is mounted on an upper surface of a lifting platform 114 of a scissor-lift providing the substructure 112.

A base 116 of the substructure 112 may be comprise driven wheels 117 to enable it to be maneuvered around a construction site easily. Some or all of the wheels 117 may be steerable too.

On conventional scissor-lifts, the wheels usually comprise solid (i.e., non-pneumatic) tyres, in order to avoid problems with punctures on a building site. The solid nature of the tyres also helps to prevent movement and unsteadiness at the top of the platform resulting from deflection in the tyres as a weight is shifted on the platform. Other arrangements to manoeuvre the substructure 112 are also envisaged, such as caterpillar tracks, which similarly do not allow a significant amount of deflection, and a hovercraft arrangement where the substructure is moved around on a cushion of air and can then rest on the ground or a stand to hold the apparatus steady.

The lifting platform 114 can be lifted with respect to the base 116 of the substructure 112 through the action of the pantograph (the hinged, criss-cross supports). This raises the robotic arm 110 towards a ceiling 124 or to a specific height on a wall 126. Scissor lifts are a familiar item on a building site and have been developed not only to be handled easily by one or more workmen around a construction site but also to fit through doorways and other such restrictions to movement.

Preferably, the robotic arm 110 comprises a plurality of segments 21, 22 which can pivot and/or rotate with respect to each other to manoeuvre the drilling device 122 about a number of axes for drilling holes in a ceiling 124 or wall 126. In one example, the robotic arm 110 may take the form of a six-axis robotic arm. However, it is to be understood that other numbers of axes could be used in order to facilitate movement of the drill device 122 as desired.

Once the motorised substructure 112 has raised the robotic arm 110 to a suitable working height the various segments of the robotic arm 110 can be moved about the plurality of axes in order to position the drilling device 122 at a point where a hole is to be made in a ceiling 126 or a wall 128. Further, the drilling device 122 can be moved to numerous points within a given reach of the robotic arm 110, to drill a plurality of holes in the ceiling 126 or the wall 128 as needed.

A control unit 134 may also be provided within the support structure 130. The control unit 134 may include one or more processors for controlling the robotic arm 110, for controlling the substructure 112 and for accessing and analysing BIM files for determining where holes should be drilled in the ceiling 126 or wall 128.

By working to the dimensions provided in a BIM file it allows the robotic drilling apparatus 100 to drill holes in a building exactly according to an architect's plan. As the robotic drilling apparatus 100 is moved around the construction site by an operator, the robotic drilling apparatus 100 may access and receive further portions of a BIM file relevant to that particular sector of the building in order to provide guidance for the control unit 134 to drill holes in specific regions of a ceiling or wall.

Further, as shown in FIG. 1, a vacuum source 132 may optionally be included in the robotic drilling apparatus 100. The vacuum source 132 may provide suction to an area surrounding the drilling device 122 to assist in the removal of debris and dust when the drilling device 122 is drilling holes in the ceiling 126 or wall 128. In the example shown in FIG. 1, the vacuum source 132 includes a hose 138. The vacuum source 132 may be removably mounted to the lifting platform 114 of the substructure 112.

In a preferred embodiment, the robotic arm 110 is made from lightweight material, for example, a stiff plastic, a fibre reinforced composite material or lightweight alloy. By contrast, typical machine handling robots for industrial uses can have a weight of upwards of 270 kg and would need to be floor mounted.

According to health and safety rules (e.g., Occupational Health & Safety, see ohsonline.com), a workman can safely lift an object of approximately 23 kg. (The prescribed figure may vary slightly from jurisdiction to jurisdiction.) In preferred arrangements, the robotic arm 110 and support structure 130 collectively may have a weight of less than 46 kg. This allows the robotic arm 110 and support structure 130 to be lifted safely and assembled by two workmen fitting the robotic arm 110 and support structure 130 on to a lifting platform 114, for example. Where it is possible to keep the weight of the robotic arm 110 and support structure 130 individually less than 23 kg, this may allow just a single workman to assemble the apparatus 100. Additionally a control cabinet for the robot would usually weigh less than 23 kg.

The parts can be mounted to the lifting platform when it is in a lowered position and at a suitable working height. Assembly of the robot generally only requires the control cabinet to be placed within the frame of the support structure, cables to power and the robotic arm connected, all of which could be completed in a matter of minutes and would not require specific training.

In this embodiment, the lightweight and modestly sized robotic arm 110, in conjunction with the substructure 112, can reach a standard ceiling height without any further effort from the operator—i.e., once the robotic arm 110 has been installed on the substructure 112, the drilling device 122 can be moved vertically and in different directions around the axes of the robotic arm 110 in order to drill holes in the ceiling or wall without any further physical intervention from the operator, other than, for example, to input instructions to the control unit 134 or to replace consumable components. Further, once the robotic arm 110 has been installed on to the substructure 112, a single operator can manoeuvre the robotic drilling apparatus 100 around the construction site. A motorised substructure 112 may also be fully autonomous and drive itself around the construction site, for example, based on a knowledge of the building from a BIM file and an awareness of its location from an electronic measuring device.

Figure 2:
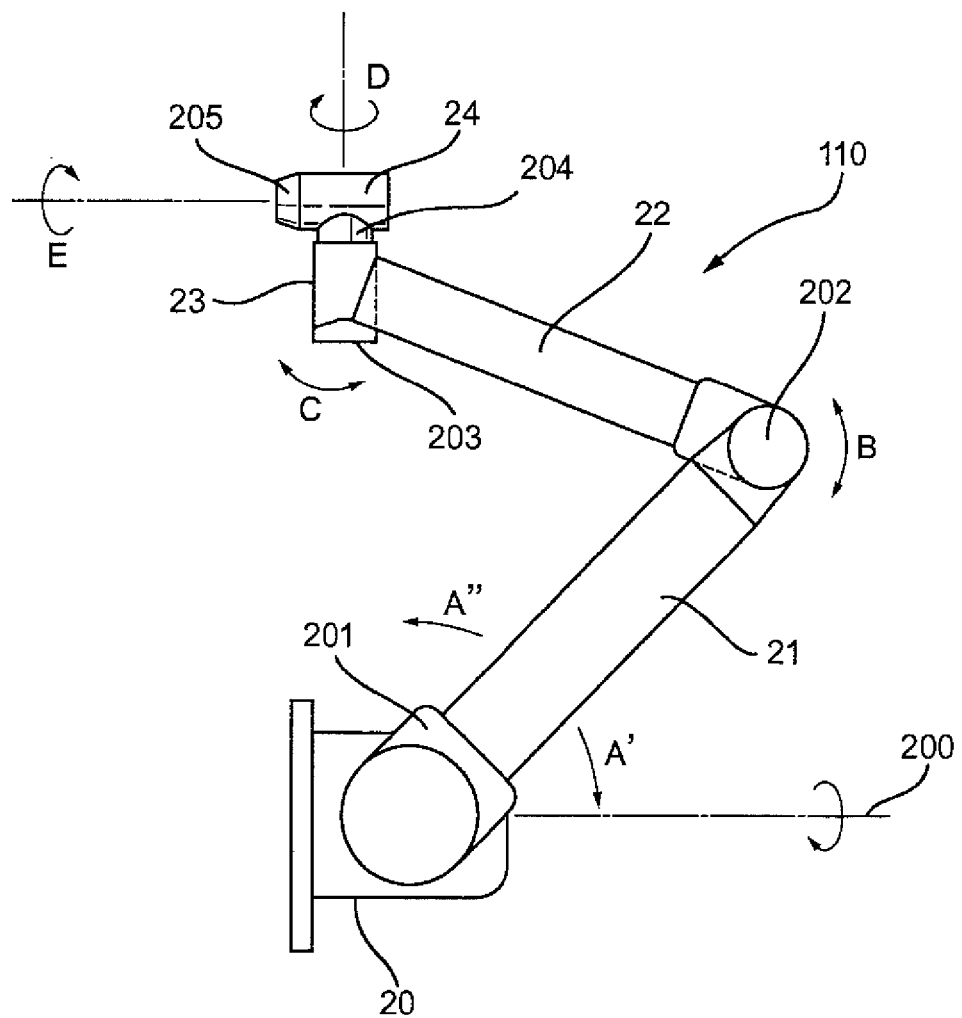
FIG. 2 shows an enlargement of a robotic arm for the robotic drilling apparatus shown in FIG. 1 illustrating the different modes of movement.

FIG. 2 shows a preferred embodiment of the robotic arm 110, in particular a six-axis robotic arm.

In the embodiment shown in FIG. 2, the robotic arm 110 includes a base mount 20 (base end 110a), first arm segment 21, second arm segment 22, first wrist 23, and second wrist 24. As can be seen in FIG. 5, a drilling device 122 can be attached to a tool flange on the second wrist 23 (the moveable end 110b).

The base mount 20 may rotate around a base axis 200 to rotate the robotic arm 110 about a horizontal axis. (All references to "horizontal" and "vertical" are intended to be interpreted as "substantially horizontal" and "substantially vertical" respectively depending on the positioning of the support structure 130 and substructure 112.) The first arm segment 21 may be attached to the base mount 20 by a shoulder joint 201. The shoulder joint 201 allows the first arm segment 21 to hinge in the direction of arrows A' and A". Second arm segment 22 may be joined to first arm segment 21 by an elbow joint 202. This allows the second arm segment 22 to move in the direction denoted by arrow B and arrows B', B" to adjust the height and lateral positioning of the moveable end 110b.

First wrist 23 may be joined to the second arm segment 22 by a first wrist joint 203, which allows the first wrist 23 to rotate 360° in a direction denoted by arrow C. A second wrist 24 may be attached to the first wrist 23 at a second wrist joint 204, where the second wrist joint 204 allows the second wrist 24 to rotate 360° in a direction denoted by arrow D. A tool flange 205 may be attached to the second wrist 24, and the tool flange 205 may rotate 360° in a direction denoted by arrow E in order to allow rotational movement of a drilling device (not shown in FIG. 2) about a further axis of rotation when attached to the tool flange 205.

Rotation in directions C, D and E allow the roll, yawl and pitch of the drilling device 122 to be controlled while rotation about axis 200 and in directions A and B allow the displacement in up-down, left-right and forward-back directions to be controlled The configuration shown in FIG. 2 represents a six-axis robotic arm. However, any number of axes may be used as an alternative to this configuration to allow the robotic arm to move in a number of directions. What is important is that the robotic arm can move in a three dimensional space and in a controlled manner to reach a ceiling or wall, and then position a drilling device 112 suitably with respect to the ceiling or wall to drill a hole therein. In order to reach a ceiling height, rather than using a floor mounted robotic arm, the robotic arm 110 is used in conjunction with a substructure 112 that can raise it to a suitable working height, such as with the scissor lift shown in FIG. 1 (or as will be explained shortly) a telescopic lift as shown in FIG. 4.

Figure 3A:
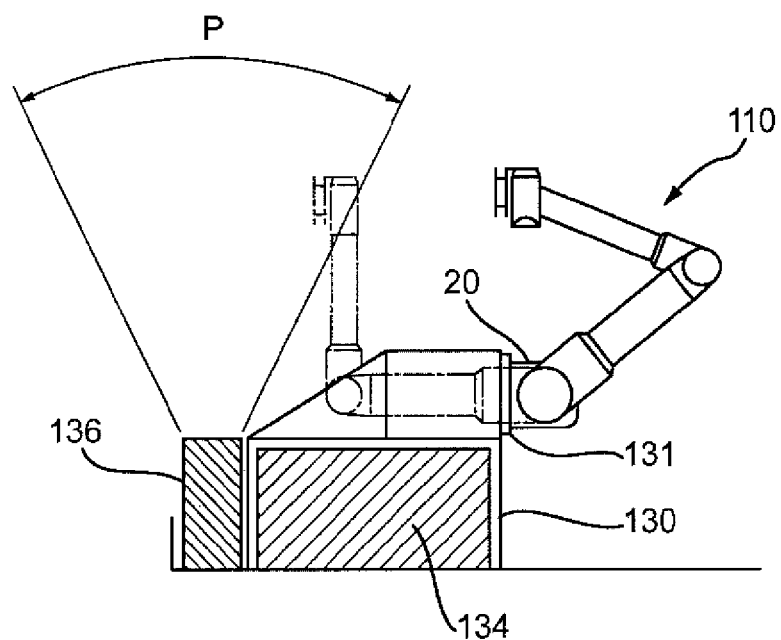
FIGS. 3a and 3b show further views of an exemplary support structure of the robotic drilling apparatus.
Figure 3B:
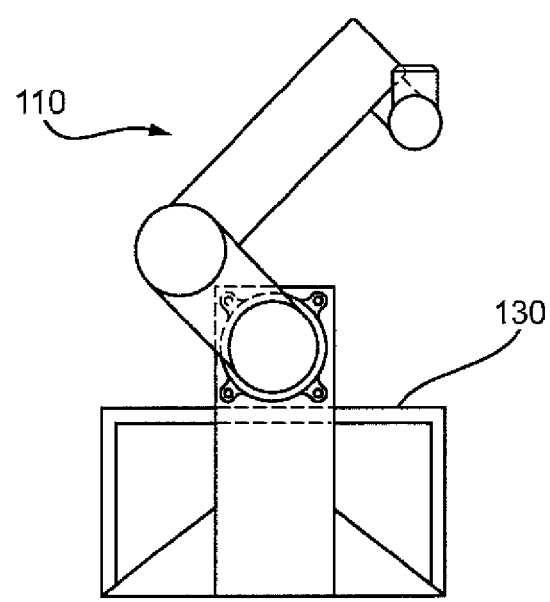

FIGS. 3a and 3b show a preferred embodiment of the robotic arm 110 and the frame that is the support structure 130. The support structure 130 may include a vertical wall 301. In a preferred embodiment, the robotic arm 110 may be mounted to the vertical wall 301. This allows for the robotic arm 110 to reach an entire region roughly centred above the support structure 130 and lifting platform 114. Advantageously, the mounting of the base mount 20 to the vertical wall 301, as shown in FIG. 3a, allows for the robot to move from a first position (shown as dashed lines) to a second position (shown as solid lines). The robotic arm 110 can extend between these positions so that a greater region of the ceiling can be reached by the robotic arm 110 than if the base mount 20 were mounted on a horizontal portion of a support structure 130.

FIG. 3b shows the way in which the robotic arm 110 can rotate around the base axis 200. Preferably the elbow joint 202 is always kept level or higher than the shoulder joint 201 so that the elbow joint 202 will not collide with the support structure 130.

Preferably the base end 110a of the robotic arm 110 is positioned approximately centrally on the upper surface of the lifting platform, so that the forces transmitted through the robotic arm 110 during drilling, are transmitted, as far as possible, through the centre of the substructure 112. This helps to maintain a good accuracy in the drilled holes.

In a preferred embodiment, the control unit 134 may be stowed away in the support structure 130—i.e., be held within the support structure 130. This keeps the centre of gravity low which helps the stability of the robotic arm 110 in use. Further, keeping the control unit 134 as a separate component from the support structure 130 allows the weight to be minimised. The weights of the robotic arm 110 and the support structure 130 are ideally kept as low as possible and preferably are within the particular health and safety limits for two workmen to be able to lift them on top of a lifting platform 114. Preferably the control unit is below 23 kg to allow a single workman to place it within the support structure 130.

A vision system 136 may also be attached adjacent to the support structure 130. The vision system 136 provides guidance for the robotic drilling apparatus 100 (shown in FIG. 1) to guide and manoeuvre itself with respect to a set of coordinates which are set relative to the building or a reference point within the construction site. Preferably, but not exclusively, the vision system 136 is a laser guidance system.

The vision system 136 can work in conjunction with the control unit 134 to provide accuracy for drilling holes in accordance with the architect's plans—for example, by working in conjunction with the BIM file. The vision system 136 therefore avoids the need for a workman to mark up all the holes on a ceiling or a wall of a building prior to commencing drilling.

Preferably, the vision system 136 is placed adjacent the support structure 130 on the opposite side of the vertical wall 301 to where the base mount 20 of the robotic arm 110 is attached—i.e., away from the robotic arm 110. This helps to provide an unobstructed field of projection P on to the ceiling 124 as shown in FIG. 3a.

FIG. 4 shows another preferred robotic drilling apparatus 400, which is similar in functionality to that shown in FIG. 1. The robotic arm 110' may be the same as previously described; however, the lifting mechanism now comprises a telescopic lift having a base portion 401 and a telescopic portion 402, in place of the scissor lift shown in FIG. 1.

The base mount 20' of the robotic arm 110' may be mounted to the side of the telescopic portion 402 at an upper end thereof, in much the same way as the base mount 20 is attached to a vertical wall 301 of the support structure 130 in FIG. 3a. This allows a greater region of the ceiling 124 to be reached by the robotic arm 110'. Telescopic portion 402 may fit snugly within the base portion 401 and can be motorised to telescope vertically in the base portion 401 in a controlled manner. The telescopic portion 402 effectively provides the support structure 130 of the previous embodiment.

The telescopic lift 401, 402 may be provided on a moveable base 116', in order for an operator to move the equipment around a construction site. As with the arrangement of FIG. 1, the base 116' may also be motorised to enable it to move autonomously according to instructions provided by a control unit 134' or under the direction of a workman. The control cabinet for the robot may be mounted between the moveable base 116' and the base portion 401 of the telescopic lift.

Advantageously, a telescopic lift 401, 402 may provide more vertical stability for the robotic arm 110', which in turn provides more accuracy when drilling holes in a ceiling or wall, particularly when a long reach is required.

FIG. 5 shows a robotic arm 110 with a drilling device 122 mounted to its moveable end 100b. The robotic arm 110 may have the same properties as that described in FIG. 2. However, in this embodiment a vibration reducing assembly 501 is provided on the robotic arm 110 where the drilling device 122 is mounted. In the example shown in FIG. 5, the vibration reducing device 501 is also the mount for the drilling device 122 and is provided on the tool flange 205 of the second wrist 24.

Figure 6:
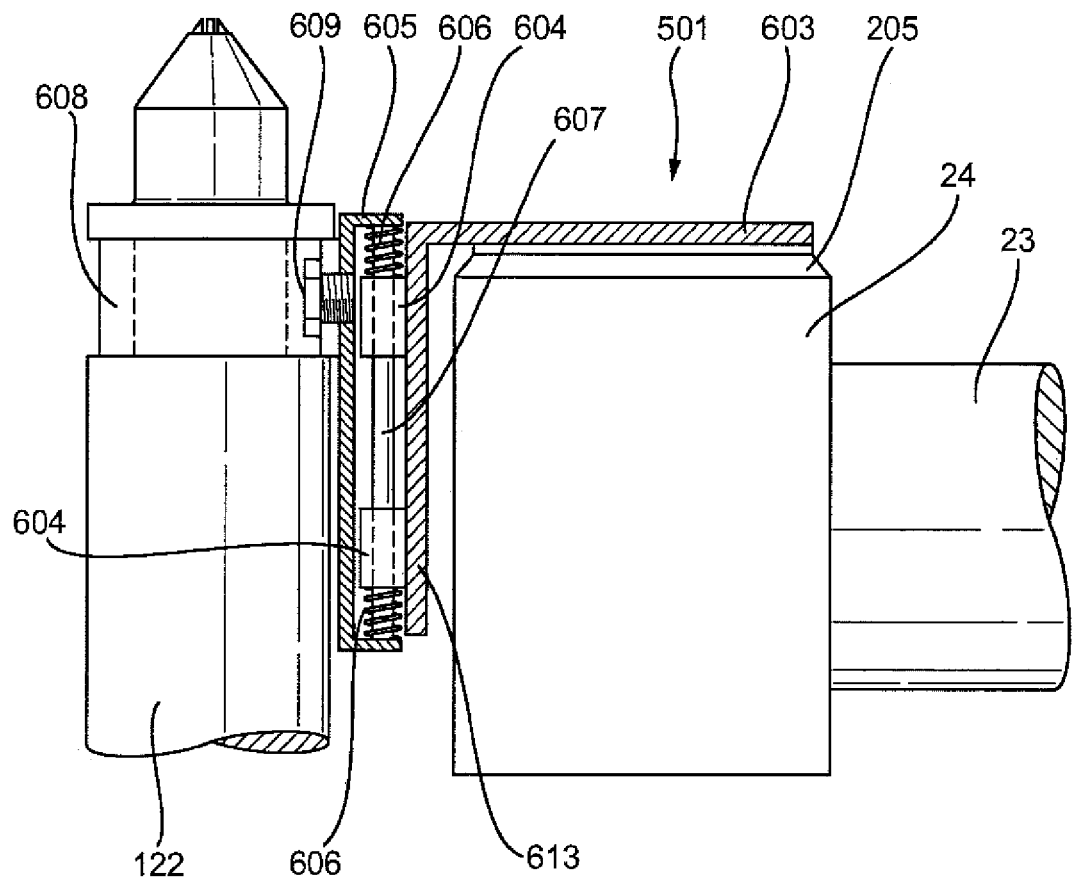
FIG. 6 shows a preferred mount in more detail.

In more detail, as shown in FIG. 6, the mount 501 can be attached to the tool flange 205 of the second wrist 24. The second wrist 23 may be joined to the first wrist 23, as described above, and via that to the second and first arm segments 22, 21. The mount 501 may comprise a first leg 603 and a second leg 613. The first leg 603 may be fastened to the tool flange 205 so that it can rotate as the tool flange 205 rotates. The first leg 603 (a tool flange adapter) extends perpendicularly to the axis of the tool flange 205. The second leg 613 extends at right angles to the first leg 603 and extends along, but separated from, an exterior of the second wrist 24. This allows for free movement of the second leg 613 around the second wrist 24 as the tool flange 205 rotates.

Preferably, a suspension system is provided in the mount to reduce the transmission of the vibrations. Linear bushings 604 can be provided for guiding one half of the suspension system along one or more guide rods 607 (for example a plurality of guide rods 607 extending in parallel through bushings 604) that are attached to the other half of the suspension system and in particular mounting plate 605.

As shown in FIG. 6, vibration damping devices, for example springs 606, may be located between the mounting plate 605 and the linear bushings 604. Preferably, the springs 606 are coil springs. However, other types of springs may also be used, such as air springs. This provides a semi-rigid mount that still allows for some movement along an axis of the guide rod(s) 607 to accommodate vibrational movement.

Although the springs have been described as being between the linear bushings 604 and the mounting plate 605, the springs may be located, for example, between the linear bushings 604 with a suitable peg or plate transferring translational movement to the springs 606.

The magnitude of preload on the springs 606 could be adjusted by a preload adjuster nut, e.g., between the bushing and each coil spring. Such a preload adjuster would allow adjustment for different masses of drilling devices, as well as for tuning the stroke/vibration amplitude of a given drilling device 122.

The mount 501 can be fitted with dust cover to keep dust and debris from the drilling away from the suspension system if desired.

Drilling device 122 may be attached to the mounting plate 605 by a drill clamp 608 extending around the neck of the drilling device 122 (preferably utilizing the cutout and shoulder normally found in a drill's body). Preferably, the drill clamp 608 is secured in place with bolts 609, which may engage a threaded portion (not shown) of the mounting plate 605.

In addition to attaching the drilling device 122, the mounting plate 605 also is able to accommodate movement of the drilling device 122 along the axis of the guide rods 607. This allows for some isolation of the vibrations that occur during drilling, particularly when using a hammer function on hard materials like concrete.

A linear position sensor can be positioned on the mount 501 to measure the current position of the mounting plate 605 relative to the robot arm. Sensor readings together with a mathematical model of the suspension springs 606 and robot arm joint positions will give fine grain control over the applied pressure from the drill to the work piece surface and drilling depth.

The drill mount 501 allows the drilling device to move linearly along the drill axis relative to the robot tool flange 205. The movement is restricted by one or several springs 606 installed such that the linear position will return to an equilibrium when no force is applied on the installation. Example of forces that will apply is the weight of the drilling device 122, the resistance when drilling, the effect of the vacuum suction, etc. The installation may be equipped with a linear position sensor that continuously monitors the linear position. The linear motion distance is limited by the technical properties of the installation. As the linear position is restricted with springs 606, the linear position sensor can be used to measure the combined force along the drill axis.

The system software will have continuous control over the linear motion sensor value, and robot motion. When the system detects that the linear position is close to the maximum allowed travel from the equilibrium, the system can move the robot along the drill axis to counteract for the limited allowed linear movement permitted in the vibration isolator. Seen from the drill installation point of view, this combined setup will act as a linear actuator with travel limited only by the reach of the robotic arm 110. This allows for a mechanical design of the tool flange adapter 603 with reduced linear travel, while not compromising on the benefits from extended linear travel.

This setup results in a number of advantages over a fixed installation:

- The spring damping of the linear movement will cancel virtually 100% of vibrations along the drill axis caused by the hammer drill 112. This is due to that spring resistance is only dependent on position, not speed. This will result in less wear on the robotic arm, allowing for both a less rigid, less expensive and a lighter robotic arm.
- The chance for a drill jam, or a robotic arm failure due to excess forces along the drill axis is virtually nonexistent.
- Better control on the force acting on the ceiling along the drill axis:
- When drilling using vacuum suction, the tool flange 205 will be virtually disconnected from the drill along the drill axis as the system will be able to control the robotic arm such that the linear motion always is at or close to its equilibrium. This allows for using the applied vacuum force to control the drill penetration force. Calculating the robotic arm motion along the drill axis can be achieved using well known control algorithms, such as PID.
- The position along the linear axis can be used as an adequately precise force sensor, as the dynamics of springs is well known, and can easily be calculated from position to applied force based on the properties of the springs used in the installation. The resolution of the measurement is a result of the allowed travel length of the linear motion multiplied by the accuracy of the linear motion sensor.
- The combined position of the linear sensor and the position of the robotic arm along the drill axis can be used to log the progress of the drill operation over time. The plot analysis will give valuable information to the system, such as:
- Verifying correct drill penetration progress. A step should be observed at the start of the curve. This step is the caused when the vacuum source is activated and the upper seal of the shroud engages the workpiece. This result in the drilling device by force of vacuum immediately is pulled upwards to contact with the workpiece from a lower position resting on the bottom guide rod springs. After an initial step a straight line on a position v's time plot is observed when the drilling device is powered and penetrates the workpiece at a constant speed.
- The drill penetration speed suddenly changed to a lower speed, or halted completely. This means the drill bit has hit something harder than concrete (such as metal), or the drill bit is broken. This causes a reduction in the gradient of the position v's time plot.
- The drill penetration speed suddenly increases. This means that the material being penetrated is softer, or that there is no more material. This will apply if the drill hits an air pocket, a plastic pipe, etc. This causes an increase in the gradient of the position v's time plot.

FIG. 7a shows a preferred shroud arrangement for use with the present invention. One significant advantage that has been discovered by the inventors is that not only can such shrouds, when used with a vacuum source, reduce the amount of dust and debris that is spread to the surroundings when drilling, they also can help to reduce the load experienced by the robotic arm when lifting the drilling device 122 to a ceiling 124. This might be a reduction of 20 N or more, preferably 35 N or more, and more preferably 50 N or more. It may even be able to apply a thrust of between 100-200 N to replicate the level of force usually required by the robotic arm to drill holes in a hard material like concrete. By increasing the diameter of the shroud it is possible to increase the amount of force created.

In the case of drilling into ceilings 124 this is of particular significance because the vibrations experienced during hammer drilling in to a hard material like concrete in combination together with a typical load of such a drilling device 122 can be harmful to lightweight robotic arms that are working close to their maximum loading. Even if the vibrations do not physically harm the harm the robot, they may cause it to shut down as an emergency response. However, by reducing the effective load on the robotic arm 110 through employing a shroud connected to a vacuum source that will force the drilling device 122 upwards through suction, the detrimental effects of the vibrations on the robotic joints and likelihood of the robot malfunctioning are also reduced. With the addition of a mount 501 which is adapted to minimise or isolate any vibrations further, the life and robustness of the robotic drilling assembly 100 can be enhanced significantly. In addition, dust and debris is collected, and noise generated through the vibrations is significantly reduced. This makes this preferred robotic drilling apparatus 100 particularly suitable for use in occupied buildings where repairs or improvements are taking place, for example, in an apartment block or hotel where people are still resident while the works take place.

The shroud of FIG. 7a can be used with any of the embodiments described above and shown in FIGS. 1-6. The suction created by the shroud 70 greatly reduces the stresses applied to the robotic drilling apparatus 100, particularly when the robotic arm 110 is working to the extremes of its reach.

FIG. 7a shows a cross section of a preferred shroud arrangement 70 for use with a vibration reducing assembly. The shroud 70 includes a shroud body 700 that fits over the top of the drilling device 122. The shroud body 700 has a drill bit seal 703 that narrows inwards over the chuck of the drilling device 122, leaving a gap for a drill bit 704 to be introduced into a chuck (not shown). The drill bit seal 703 acts as on the drill bit, resting snugly against the drill bit 704 when the drill bit 704 is introduced. The drill bit seal 703 may be formed from a material like rubber that has a degree of flexibility so that a seal can be formed around any size of drill bit 704. The drill bit seal 703, acting as a seal, does not impede the movement of the drill bit 704.

Bellows 706 extend upward from the shroud 70 to form an upper part 71 of the shroud 70. A main vacuum chamber 705 is defined within the bellows 706 for collection of dust and debris from the drilling. The drill bit seal 703 closes off the bottom of the main vacuum chamber 705 to allow a vacuum to be created in the main vacuum chamber 705. (Any reference herein to "vacuum" is intended to indicate a region of reduced pressure compared to atmospheric pressure; it is not required that a deep vacuum is created in any of these parts, just sufficient reduction in pressure to remove debris adequately and reduce the weight carried by the robotic arm.)

A vacuum port 702 is provided for connection to a vacuum source 132 by, for example, using a vacuum hose 138. A vacuum connector 720 connects the vacuum port 702 to the main vacuum chamber 705 of the shroud 70. Bellows 706 extend around the drill bit 704 for a full length of the drill bit 704. The vacuum connector 720 and exterior surface of the shroud 70 provide a passageway 756 for fluid flow from the main vacuum chamber 705 to the vacuum port 702.

The surface of the passageway 756 may be profiled with a slanting surface 701 that extends as a projection of an upper surface at the top of the shroud body 700 and slants towards the vacuum connector 720 in a downward and downstream direction. The slanting surface 701 advantageously aids dust and debris to fall towards the vacuum port 702 when the drilling device is drilling holes in a ceiling 124. The vacuum port 702 is positioned below the upper section 703 of the shroud body 700 in use drilling a ceiling in order to keep the vacuum hose 138 out of the way to the side of the shroud body 700.

An upper seal 707 located at the top of the bellows 706 is arranged to seal against a ceiling (or wall) in which a hole is to be drilled. Preferably, the upper seal 707 is made of a material and is configured so that it forms a vacuum seal easily between the bellows 706 and the ceiling (or wall).

The bellows are configured so that an upper seal 707 is located above the drill bit 704, such that a build-up of vacuum can occur in the main vacuum chamber 705 before the drill bit comes into contact with a ceiling 124. The bellows 706 are compressible in a drilling direction—i.e., along the longitudinal axis of the drill bit 704. They may be arranged to allow compression also in an inclined direction for where it is desired to drill a hole at an angle rather than perpendicularly to the work surface.

A dust guard 708 is located between the upper seal 707 and the bellows 706 and extends perpendicular to the drilling direction. Its purpose is to reduce the dust marks that can be created on a ceiling (or wall) when drilling using a shroud. Often workers drilling into a ceiling with a shroud fitted will prefer to drill with the vacuum shroud pulled back a bit, using it as a cup to collect dust, but without creating a vacuum chamber in order to avoid leaving marks. Thus they consciously sacrifice the positive effect of the vacuum for the sake of not having to clean dust marks afterwards. The dust guard 708 is intended to avoid the formation of such marks while using the full vacuum effect of a shroud 70.

A gap y is formed in the dust guard 708 to allow the drill bit 704 to move freely through the dust guard 708. An opening 709 is also provided in the dust guard 708 to maintain equalized pressure above and below the dust guard 708. The opening 709 will allow dust and debris to fall into the main vacuum chamber 705 and exit via the vacuum port 702. To assist in moving the dust and debris towards the vacuum port 702, there may be provided one or more leak holes 711 in the bellows 706. Such leak holes 711 allow some air flow into the main vacuum chamber 705 to drag the dust and debris towards the vacuum port 702 where it can exit to the vacuum source (not shown).

A dump valve 710 may optionally be provided in the vacuum connector 720. The dump valve 710 may open to draw in more air to reduce the vacuum in the main vacuum chamber 705 at times where the vacuum is too great to maintain the function of the drilling device. The dump valve 710 therefore provides a controlled environment within the main vacuum chamber 705 so that the drilling device 122 can function properly.

There is some synergy through the shroud 70 not only collecting dust and debris via the vacuum source 132, but also reducing the risk of malfunction or damage to the robotic arm 110 by reducing the effective loading on the robotic arm and the amplitude of the vibrations being transmitted. This is particularly true when vibrational movement of the drilling device 122 is isolated by using a suspension system as described in connection with FIG. 6.

Figure 7B:
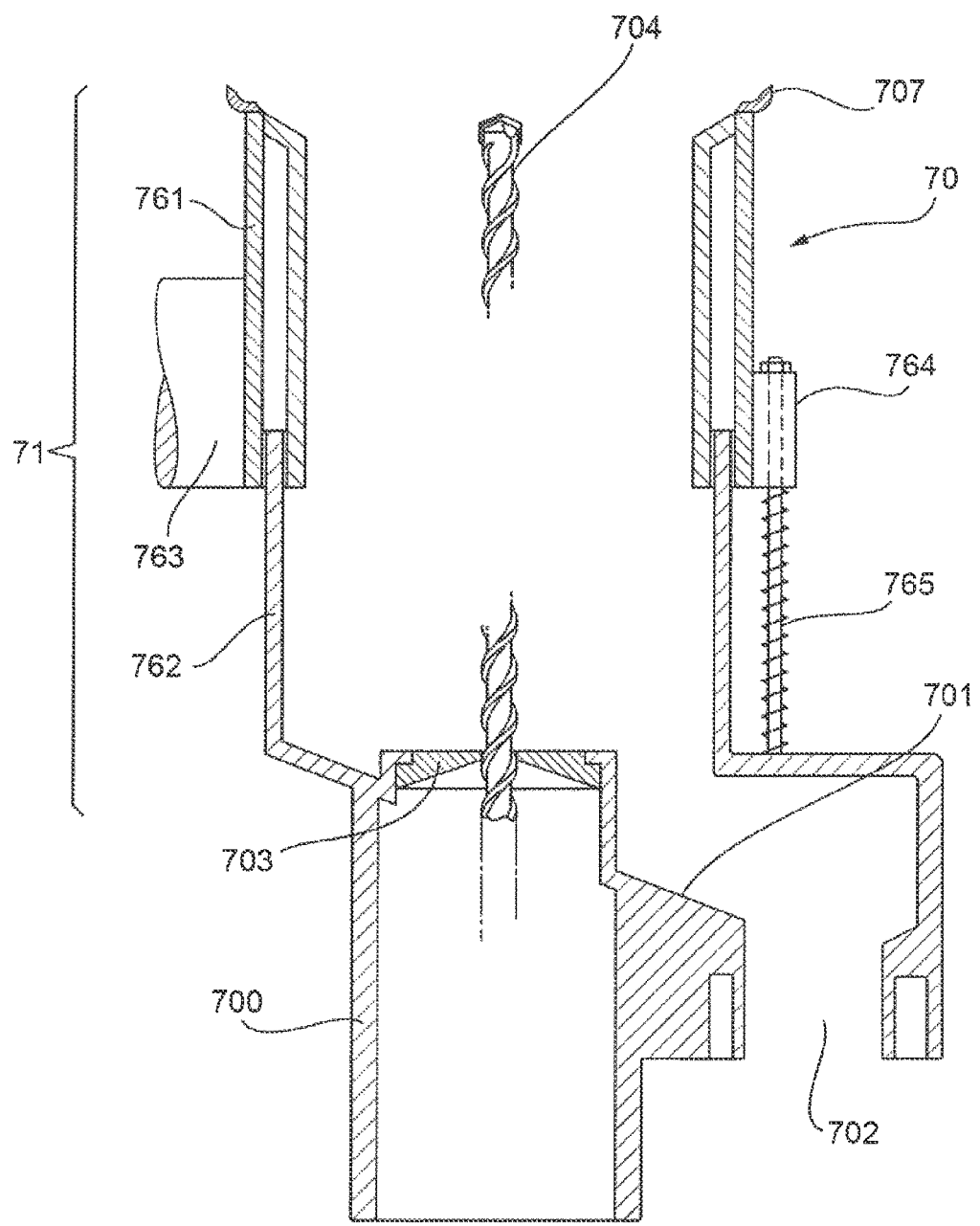

FIG. 7b shows an alternative embodiment of the shroud 70 where the bellows 706 have been replaced with a telescopic body of rigid upper and lower mating parts 761, 762, mounted together in way that holds the vacuum within the main vacuum chamber 705. The upper part 761 may be double walled as the figure indicates to better keep dust away from the interacting surfaces of the upper and lower parts 761, 762.

This embodiment differs from the previously described embodiment firstly in that the need for a linear suspension system is removed. Instead the upper part 761 connects directly with the tool flange 205 and tool flange adapter through a fixed mount 763.

The vacuum in the main chamber 705 acts in the same manner as the previous embodiment, resulting in suction that presses the lower part 762 connected to the drill 122 against the workpiece. However, any vibration created from driving the tool bit 704 into the workpiece will not be transferred to the upper part 761 as long as friction between the upper and lower parts 761, 762 is minimal. A travel limiter 764 inhibits the lower part 762 from detaching from the upper part 761.

A return spring 765 is included in the case where the tool flange adapter is mounted to the lower part of the telescoping embodiment. The return spring is sufficient to press the upper part 761 away from the lower part 762 to form a fully extended main vacuum chamber 705 while the upper part 761 is not in connection with a workpiece. With the vacuum enabled, the return spring 765 does not inhibit the collapse of the telescopic main vacuum chamber as a hole is drilled in the workpiece.

This embodiment differs further in that the top lip 707 also includes rugged studs which grip the workpiece firmly by lateral friction rather than just suctional force acting axially. Together with the rigid-walled upper part 761 and fixed mount 763 to the tool flange this alternative embodiment works like a ground-to-ceiling jack as it allows for a rigid connection from the workpiece, through the robotic arm 110, the support structure 130 and substructure 116 all the way to the surface below the substructure 116. The robotic arm 110 can exert all its available force to hold the upper part steady against the workpiece, increasing accuracy and mitigating increased wear on robotic arm 110 similarly as for the preferred embodiment. By forming the explained rigid connection to the workpiece, the alternative embodiment will reduce vibrations transferred to the robotic arm also in perpendicular axes to the drill axis.

Figure 8A:
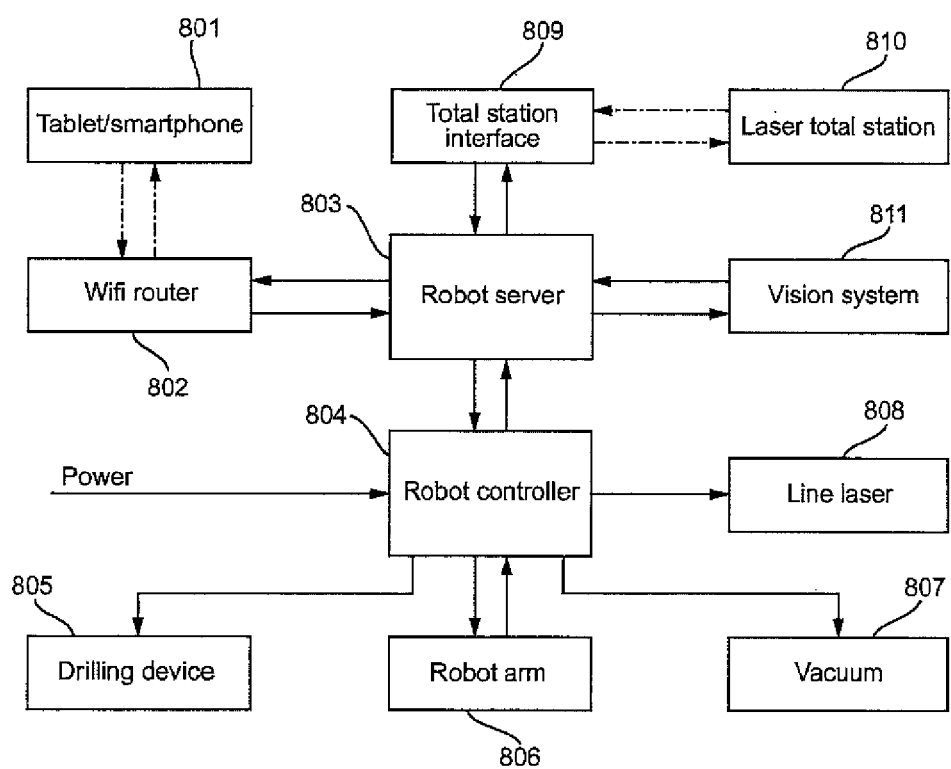
FIGS. 8a and 8b show flow charts of how the various components of a preferred robotic drilling apparatus interact.
Figure 8B:
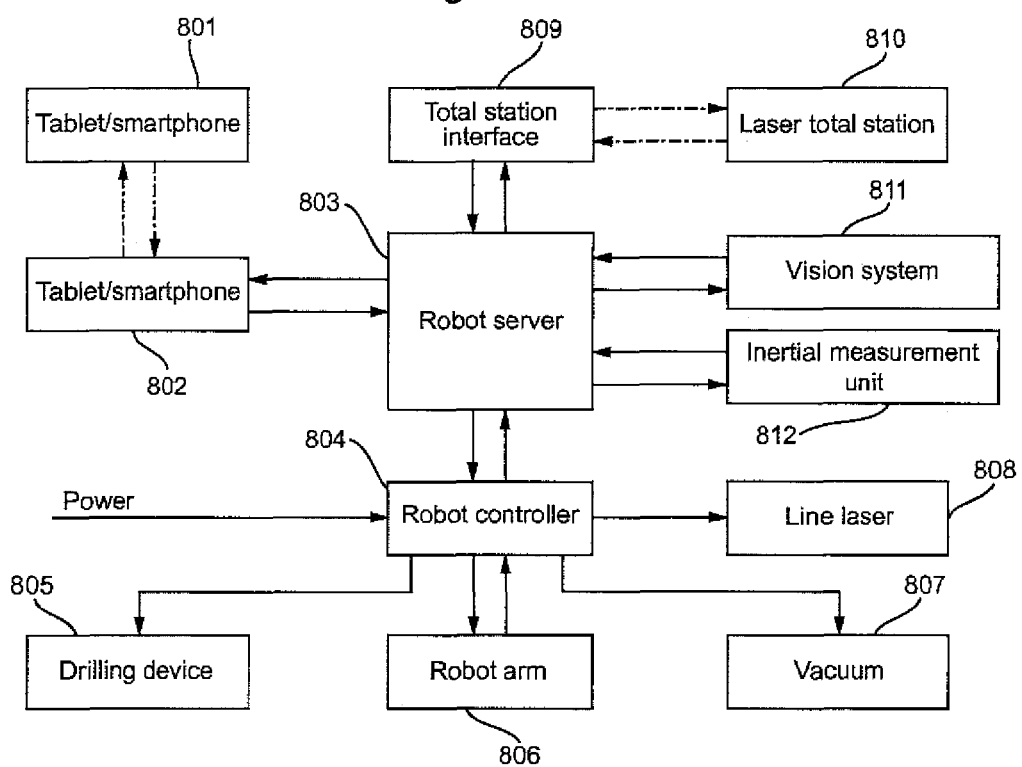

FIGS. 8*a* and 8*b* show flow charts of how the various components of the robotic drilling apparatus interact.

The preferred robotic drilling apparatus 100 comprises a computing device 801, for example a tablet or smartphone, which is able to communicate with a wifi router 802. The wifi router 802 can communicate with a robot server 803 which is coupled with a robot controller 804. The robot controller 804 is able to control a drilling device 805, a robot arm 806, a vacuum 807 and a line laser device 808. The robot server 803 receives further inputs from the a total station interface 809 which connects to a laser total station 810, as well as a vision system 811. The robot server 803 may also receive data from an inertial measurement unit (IMU) 812 as shown in the similar arrangement of FIG. 8*b*. This will be discussed in more detail below.

A computing device 801 such as a laptop, tablet or smartphone, etc., may be used in order to communicate with the robot server 803. The communication could be via a wired connection but is preferably via a non-wired connection, such as via wifi, through an internet connection, a Bluetooth connection or a radio transmission.

The robot server 803 is able to calculate the precise position of the robotic drilling apparatus 100 and its drilling device 122, and can keep track of all the robotic drilling apparatus' movements. It can feedback statuses of its current position to the operator via the computing device 801.

The current position may be calculated based on inputs from a laser total station 810 and a vision system 811 (preferably located on the robotic drilling apparatus 100). The total laser station 810 may be provided in the vicinity of the robotic drilling apparatus 100 on the construction site floor (or wall), close to where the drilling is to occur.

In some situations, where efficiency is a priority, an inertial measurement unit (IMU) 812 can deliver position and orientation data such as yaw and distance travelled, to the robot server 803. For example, in situations where accuracy is less important, such as dropped or suspended ceilings, the speed of the IMU 812 in obtaining measurement data (which can be much faster than the total station measurements, particularly when using multiple prisms to measure yaw as well as distance) can speed up the drilling operation. The IMU 812 can be used alone or in combination with a total station 810 e.g. to calibrate gyro drift.

The robot server 803 can receive BIM files in order to provide a virtual model of the building and its requirements. This information can be used to guide the movement of the robotic arm 806 and drilling device 805. The robot server 803 may include a USB port or similar input port to receive BIM files from a USB device or other memory device. The robot server 803 may also receive the BIM files from an online server via an internet connection, for example, through the router 802. It could also receive BIM files from a computing device 801 used by the operator, for example, in the case where the BIM file or relevant portion of a BIM file has been downloaded to the computing device 801, e.g., an operator's tablet that has been brought into a site office and loaded with the files for a given construction project.

For smaller areas, the laser total station 810 may not be required. For such tasks, the robotic drilling apparatus may not need to determine its global position but instead having knowledge of a local position and orientation through its vision system 811 may be sufficient. A laser line may be provided on the ceiling 124 or wall 126 (from the line laser 808) as a reference line to the vision system 811. A pair of laser lines may be used to create a laser cross within the field of view of the vision system 811.

The controlling software or app, e.g., on the operator's tablet 801 could support both of these modes of operation (namely, the robot server knowing its global position or simply a local position). It could allow the operator to choose between a total station mode, a laser line only mode or a single hole mode, which can be helpful, for example, if the operator spots a hole missing in a pattern. The operator can then simply aim a laser pointer to mark the position of a single hole to be drilled within the field of view of the vision system 811.

The computing device 801, e.g., the tablet or smartphone operated by an operator, is preferably a stand-alone component. It preferably communicates with the remainder of the robotic drilling apparatus 100 wirelessly, to allow the operator to stand back from the robotic lifting apparatus 100 as it proceeds to drill holes.

The robot controller 804 also controls internal relays to power the line laser(s) 808 used by the vision system 811. The robot controller 804 can also control the power to the drilling device 805 and vacuum 807.

The wifi/router 802, the total station interface 809, the robot server 803, the vision system 811, the robot controller 804, the line laser 808, the drilling device 805, the robot arm 806 and the vacuum 807, can all be positioned close to each other, for example as an assembly of components mounted on the substructure 112. Only one power cord is needed and power can be supplied internally to all of these components.

As mentioned above, the robotic drilling apparatus 100 may access and retrieve BIM files to allow it to determine where to position the drilling device 122 in order to drill a prescribed pattern of holes in a ceiling 124 or wall 126. By referencing the BIM files, the robotic drilling apparatus 100 can drill holes according to an architect's plans without the need for a workman to first measure up all the holes. The BIM file may contain information describing not only the position of a hole in a ceiling 124 or wall 126, but also the depth and angle of the hole relative to a given reference point.

The robot controller 804 may also be able to look up the hole dimensions, hole positions and hole orientations for a given component specified in a BIM file from a library file. The library file may be held on a remote server that is accessed via the router 802. The library file may be provided by the manufacturer or it could be a database of the hole requirements for a range of commonly specified fixtures.

From the information in the BIM file, the robot controller 804 may also be able to sort and group together a schedule of works, for example, according to hole diameter, or the particular floor or room. The robot controller 804 could also calculate optimal positions for where the robotic drilling apparatus should be positioned to execute the schedule of works and optimal heights for the robotic arm to be lifted to in order to keep the number of position and height changes to a minimum. Details of where to move the robotic drilling apparatus 100 to next in order to achieve optimal productivity can be conveyed to the operator via a display on the computing device 801.

Thus in preferred embodiments all that may be required of the operator is for the robotic drilling apparatus 100 to be set up and then activated. The robotic drilling apparatus 100 can then proceed to drill a pattern of holes in a ceiling or wall autonomously and finish them with plugs or a colour coding for the various trades to come in and fit the appliances and components.

The colour coding may comprise a paint, ink, pigment, gel or other coloured substance deposited in or around a drilled hole. The coloured substance may be removable with water or other solvent to avoid the marks being seen or affecting other paint finishes. The coding may also comprise stickers or other flags or marks to indicate the various holes.

It is known that plugs for drilled holes can come in a range of colours, usually to indicate the size of the plug/hole. In the present invention, the plugs may be colour coded to indicate the particular fitting which they are intended for or to indicate the particular trade the holes are being prepared for or subdivisions within such groups, e.g., one colour for lighting, another for power, another for data lines, another for security systems, another for safety systems, etc. Instead of colours, the plugs may be marked in some other way, e.g., with a shape or code. An advantage of such marked plugs is that they are covered over by the fitting (or other fitted component) so that the marks are not visible in the finished building.

Where the holes for particular fittings or particular trades have been set out in the BIM file, it may be possible to have a light emitting device illuminate the holes for particular fittings or trades from the information contained in the BIM file when the time comes to fitting out the building. Drilled holes can be used to set the coordinates for such mapping.

Instead of physical marks, the construction worker may be provided with a visual aid to observe virtual marks generated by the BIM file (or an enriched electronic file where the drilled holes have been added in to the BIM file if they were not present, e.g., generated by the robot server, which has determined the position of the holes), and overlaid on an image of the room. For example, the virtual marks could be displayed on a portable electronic device, such as a tablet or smartphone as an overlay on a camera image of the room, or as an overlay on a view through electronic eyewear.

Generally speaking, all moveable lifting platforms found on a construction site are designed to be sufficiently narrow to be able to fit through standard doorways. It is desirable that the robot arm 110 should have as much reach as possible while remaining light weight. In practice this means its reach will be outside the platform area of the scissor lift. Although scissor lifts are strong in the vertical direction, they can lack some rigidity when a mass located on the work platform shifts sideways and especially when this weight is moved outside the platform area. This lack of rigidity can result in a loss in accuracy when trying to drill a hole that is outside the platform.

Figure 9A:
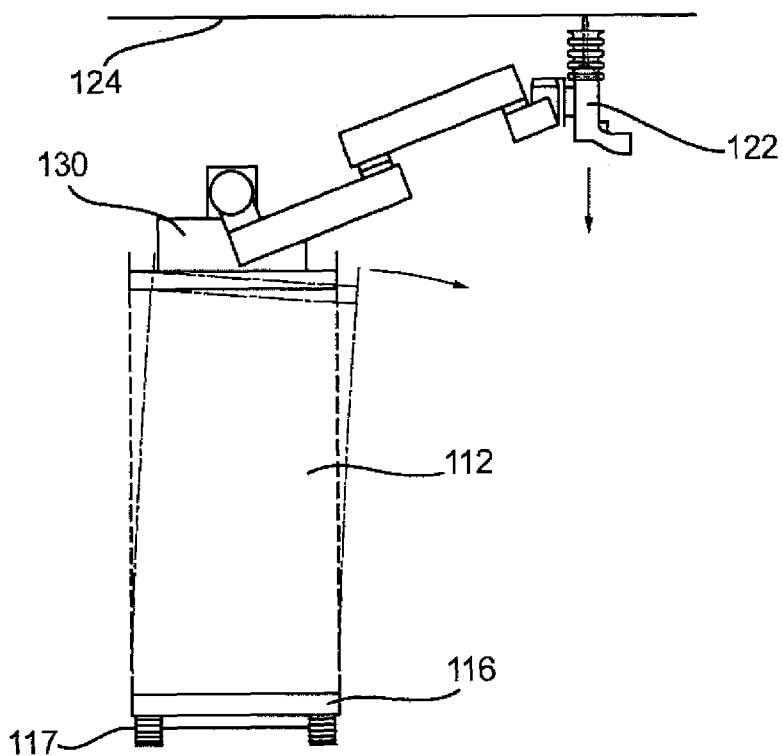
FIGS. 9a and 9b show an illustration of a robotic arm at a full sideways reach and an exaggerated view of a drill bit at full reach.
Figure 9B:
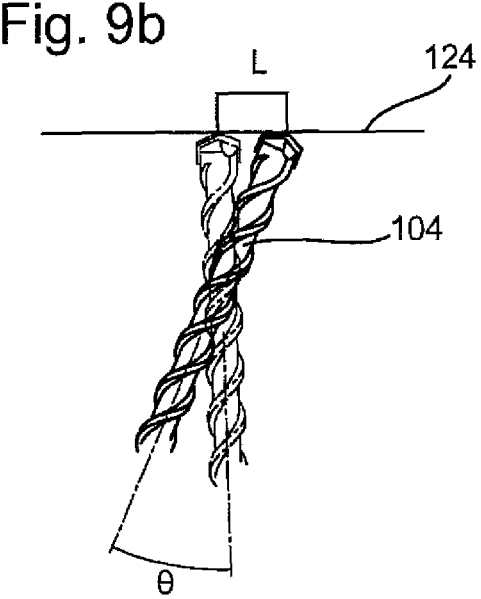

FIG. 9a shows an illustration of a robotic arm 110 drilling into a ceiling 124 at full reach, in this case to the right of the substructure 116. Drilling a hole in concrete requires an upward force of about 100-200 N. This will result in an increased bending momentum from the right before starting to drill. This will result in the drill bit being moved sideways laterally (L in FIG. 9b) as well as the drill bit angle being altered (angle $\theta$ in FIG. 9b) as a result of the altered angle of the work platform. This will easily result in the drill bit 704 skipping and thus missing its intended position, or in cases where it does manage to pierce the surface and create a hole, the drill bit is likely to jam.

The problem here is that the drilling force is usually greatest when initiating drilling (depending on the drill). This can be explained by how a rotary hammer works. A certain threshold of force is required to get the hammer part activated. However, the force needed to maintain hammering after initiation is a little lower than the initial peak force. The effect of this is that even if the platform has managed to withstand the initiation of a hole, it will swing back to a position closer to its neutral position. If the drill bit has already entered the workpiece significantly, this can easily cause a jam. Alternatively, it does not jam, due to more friction from the hole walls, the required force to continue drilling is again increased. Applying more power will start the cycle over again. Without vibration dampers or a more rigid structure standing oscillation is observed, and this can cause the robot to enter a safety shutoff mode, rendering it useless.

One important feature of the moveable robotic drilling apparatus is its accuracy. The combination of a movable and elevating substructure, which inherently has limited accuracy, and a highly accurate robotic arm is provided to achieve the required range of motion (specifically in height) and accuracy (preferably within 1 mm). Also any bending caused by shifting mass can also be compensated for by the vision system 811 and/or laser system 808, 810 and/or inertial measurement unit 812 before engaging the drill 122, 704, so overall there should be no appreciable loss in accuracy. An aspect of using an elevating substructure 112 such as a scissor lift, is that it is difficult to predict the amount of sway caused by the bending moment when the robotic arm is extended to one side. The inertial measurement unit 812 can be used to measure the amount of sway and a compensation determined to reduce inaccuracies. In combination with the vacuum shroud 70 it further assures correct positioning of the drilled holes.

Although a scissor lift is a heavy piece of equipment, which it needs to be so as not to topple over when extended fully and while holding at least a person on the work platform 114, there is still a need to for the robotic arm 110 to be as lightweight as possible. When the mass of the robotic arm is outside the footprint of the platform, for example, when the arm is at full reach, there is a danger of it toppling. Although a heavy robotic arm could reduce potential problems from oscillations, the complete setup would be too cumbersome to apply in practice. Hence there is the need for a setup that works while still employing the lighter weight robotic arms.

Regarding the vibrations it should be noted that these can be divided into two types. One is the direct vibration caused by the drilling device 122. This is a high frequency, low amplitude vibration that is also known to cause "hand-arm vibration syndrome" (HAVS, which is considered as an industrial condition (source: hse.gov.uk). Although having a robotic arm hold the vibrating tool removes this risk of injury from the human worker, the vibration might still cause problems for the robot. Having in mind that the robot is a high-precision system and susceptible to outside distortion, there is a need for a vibration damping device between the vibrating tool and the robot arm.

The vibration damper alone does not remove the force needed to drill into the workpiece. Although smoothing out the transients/peaks, a significant force is still required for the drill bit to penetrate the workpiece. This force is what creates a bending momentum to the elevated platform in situations where the resultant force (drilling force and gravitational pull on the robotic arm with the drilling device) works outside the footprint of the platform. This bending momentum can potentially be dangerous and cause the platform to topple over.

The vacuum device (the shroud and the vacuum device 132) is added to contain the drilling force within a closed environment, in this case by creating a vacuum force to counter the drilling force. The only force then working to bend the platform is the constant force being a result of the weight and position of the robotic arm 110.

One can also see an application where the vacuum force not only counters the drilling force, but also counters the weight of the robotic arm. However, this has less effect in practice because the weight of the robot cannot be countered while the drilling device is being moved into position because it requires a firm fluid connection to the workpiece. The bending momentum and toppling danger can only be reduced by using a lightweight robotic arm. However, a more lightweight arm is more affected by the tool vibration by laws of physics, making the advantages achieved by using a vibration damper more significant.

One final detail is needed in this equation. The reason for applying a high-precision system like a robot is to achieve a high degree of accuracy. Introducing the vibration damper as described herein will reduce this accuracy, at least in the drilling direction. However, overall, the benefits of the vibration reducing and damping system improving the robustness of the robot's operation and its improving its longevity is preferred.

Figure 10A:
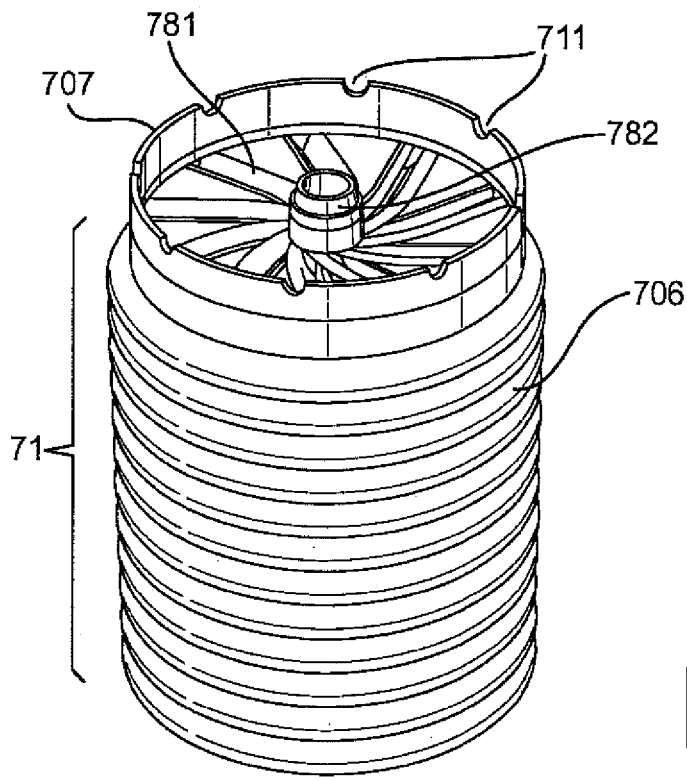
FIGS. 10a and 10b show a perspective view and a sectional view of a further preferred shroud.
Figure 10B:
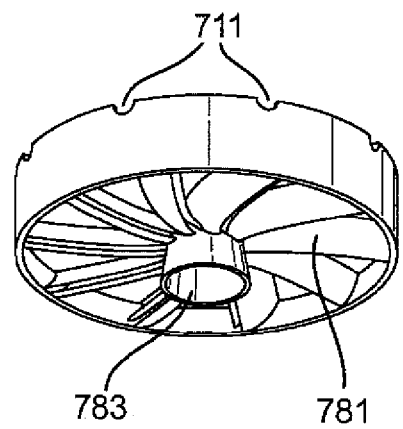
Figure 10C:
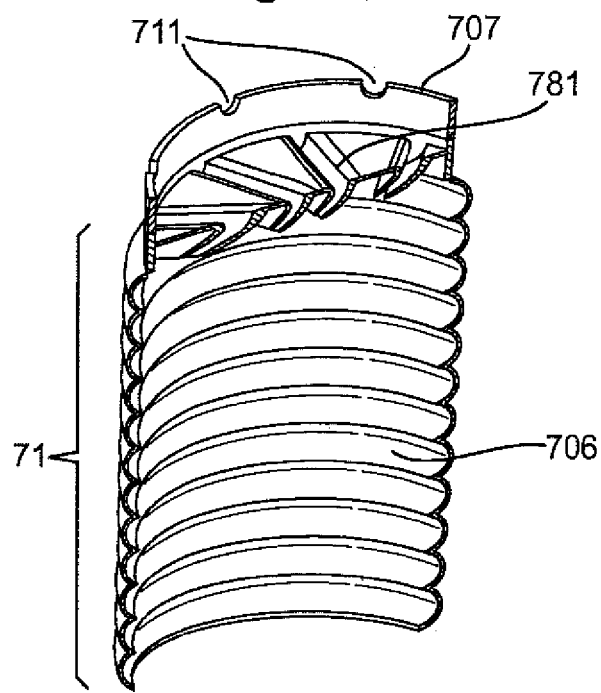
FIG. 10c shows an enlargement of a preferred dust guard.

FIGS. 10*a* to 10*c* illustrate a shroud with an alternative preferred dust guard 708 for the shroud 70. FIG. 10*a* is a perspective view of the shroud, FIG. 10*b* is an axial cross-sectional view, and FIG. 10*c* is a view of the dust guard from below.

In this embodiment, leak holes 711 could be situated above the perpendicular dust guard vanes 781 to facilitate a controlled air flow for dust removal. The perpendicular vanes 781 are slanted and curved like turbine blades to aid the formation of a vortex in the air to help guide dust created by the rotating drill bit 704 to be drawn inside the main vacuum chamber 705 during normal operation. The centrifugal force will move heavier particles like dust towards the outside of the vortex. The wall of the bellows 706 is formed as a spiral pointing away from the ceiling 124 (or wall 126) to use this inertia as an advantage, spinning the dust towards the vacuum port 702. Preliminary tests (August 2015) have shown the dust guard can reduce ceiling dust marks to such a degree that the marks are not visible unless the ceiling is studied at a shorter range than is normal from the ground.

The tip 782 of the protruding central cylindrical part 783 of the dust guard 708 is made a soft material that easily compresses, allowing contact with the workpiece 124, 126 without preventing any contact or degradation in the seal between the upper seal 707 and the workpiece 124, 126.

The drill mounting device allows the drill to move linearly along the drill axis relative to the robot tool flange. The movement is restricted by one or several springs installed such that the linear position will return to an equilibrium when no force is applied on the installation. Example of forces that will apply is the weight of the drill, the resistance when drilling, the effect of the vacuum suction, etc. The installation is equipped with a linear position sensor that continuously monitors the linear position. The linear motion distance is limited by the technical properties of the installation. As the linear position is restricted with springs, the linear position sensor can be used to measure the combined force along the drill axis.

Figure 11:
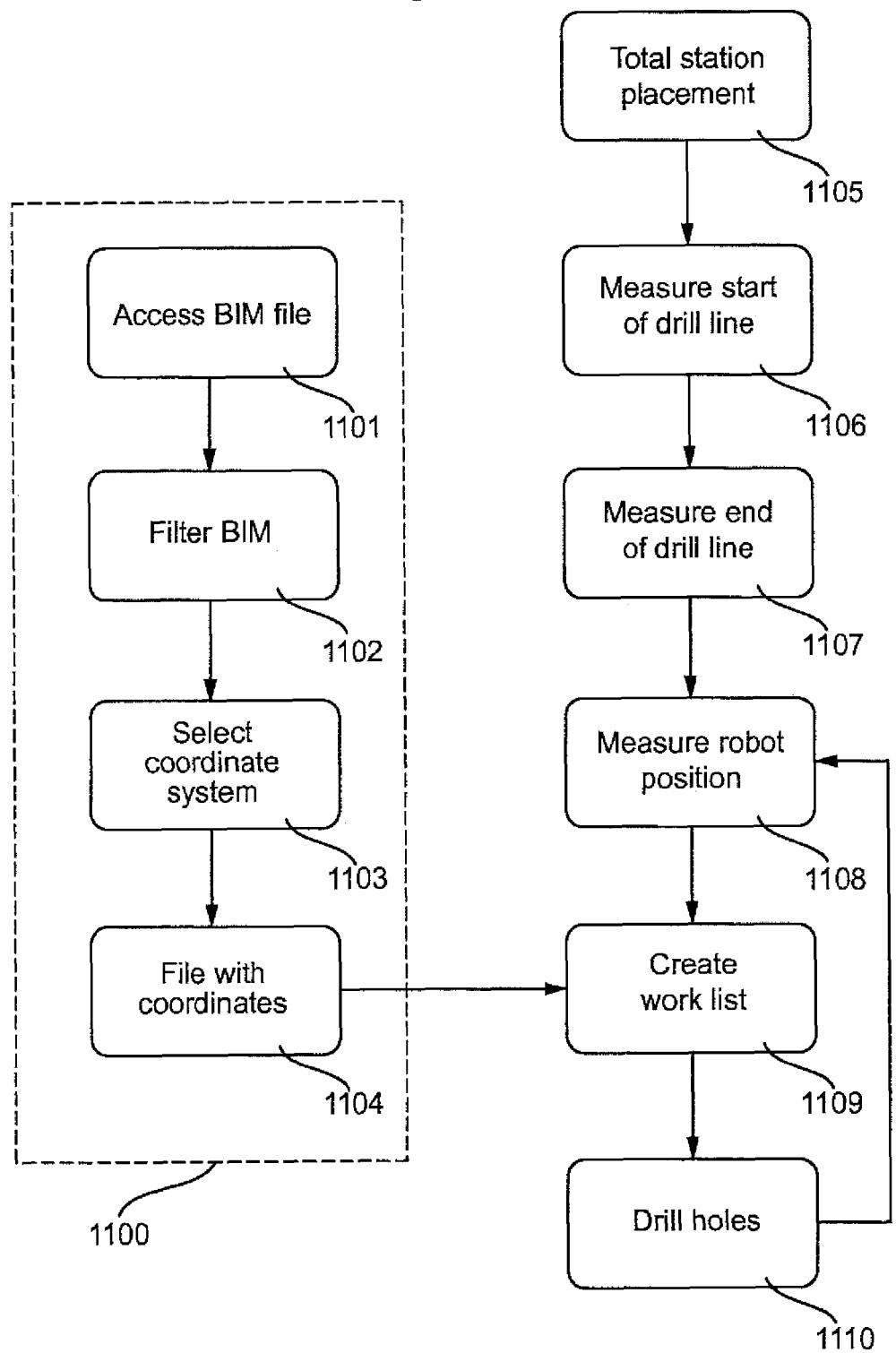
FIG. 11 is a flow diagram showing the process steps for setting up the drilling apparatus when using information from a BIM file.

FIG. 11 is a flow diagram illustrating exemplary process steps that the drilling apparatus 100 takes when setting up to drill a set of holes as planned in a BIM file. The steps on the left-hand side of the figure within the rectangle 1100 can be performed anywhere, for example, in a planning or construction site office. The steps on the right-hand side of the figure would be performed at the physical construction site.

In step 1101, the BIM file is accessed. The BIM file may be stored on a cloud server or stored on a local computer, for example, on a computer drive or portable memory device, such as a USB-stick or similar. The BIM file may then be filtered in step 1102 to extract the parameters needed by the drilling apparatus 100. For example, the BIM file may be filtered to select only the objects requiring drill holes. From the BIM file, the parameters for the holes can be extracted, for example, the coordinates, the depth, the bore, the finishing, etc., for each hole can be extracted.

Within this step 1102, a step of looking up the drill hole information for a given product may be conducted. For example, the BIM file may include a code for identifying a product, which a computer system can then look up, or a hyperlink may be provided to a website with product dimensions, etc. The computer system performing these look up operations may be the robot server 803 in FIG. 8*a* or 8*b*, or it may be a remote server that the robot is able to communicate with. It may be the same computer system that holds a copy of the BIM file.

Having determined the parameters for the holes, the computer system then selects an origin and orientation of a coordinate system for describing the set of drill holes in step 1103.

The computer system (which might be a remote server or might be the robot server) then generates a file of the coordinate values for the drill holes from the (filtered) BIM file information. This might be in the form of a CSV file for example.

In step 1104, in the case where the file with the coordinate values and other descriptions of the holes is generated off-site, the file is then sent to the robot server 803 where it can be incorporated in a work schedule list at step 1109.

The steps 1101-1104 may take place on an external computer system, which might be, for example, the architect's server, the computer system of a planning or construction site office, or a computer system of the company responsible for the robot drilling apparatus 100. In one example, these steps are conducted by a processor of a laptop or a tablet and the information is transmitted to the robot server in step 1104 by a Wi-Fi or Bluetooth type communication. In another example, the robot server 803 may be able to perform one or more, possibly all, of the steps 1101 to 1104, under the control of an interface that the operator uses, e.g., on a laptop or tablet computer.

At the construction site, the total station 810 is placed within the building (step 1105). The actual position of the total station 810 is not critical, so long as it is placed somewhere with line of sight to the ceiling or wall to be worked on.

A point to note here is that the operator does not need to measure the position of the total station 810 as he/she would normally have to do when conducting a site survey, hence saving some time (the measuring-in of the total station 810 is done indirectly when mapping the virtual drilling line to the drilling apparatus 100 at the later step 1108 discussed below).

Next, the operator would measure a start point for a drill reference line in step 1106. This typically might be the centre of a first light fixture in a row of light fixtures. Often several rows of fixtures are arranged parallel to each other in a room. The start point on the drawing would be found in the real world by finding features light walls, corners, etc., in the same way as it is done when holes are to be drilled by hand. The start point would be localised in the real world by making a mark on the ceiling (or wall).

The operator would then measure an end point for the drill reference line in step 1107, for example, by localising a point further down the row of light fixtures, and mark it in the same way.

A reflector prism may be held in place at the start point. Using an interface for the robot software, this position can be measured by the total station 810. The position may be stored automatically in the robot server and is preferably given the same origin (0, 0) as in the BIM file coordinate system. The reflector prism can then be moved along the drill reference line to the end point marked on the ceiling and the position can be measured by the total station 810 and stored in the robot server. The position of the endpoint may be stored using the same origin for the BIM file, e.g., (X, 0) where X is the distance along the notional x-axis of the BIM coordinate system.

These two points have now mapped both the origin (0, 0) and the orientation, since the direction of one axis mapped out is normal to the other axis given an orthogonal coordinate system. This also implicitly measures the relative position of the total station 810 with respect to the virtual drilling line that can then be used as a reference for all holes in the work area.

In step 1108, the position of the drilling apparatus 100, and in particular the robot with its robotic arm, is measured relative to the total station 810 coordinate system (total station coordinate system) so that it is mapped with the BIM coordinate system.

The relative orientation of the drilling apparatus 100 also needs to be measured and this can be supported in several ways as will be described below.

The operator could line up a visible laser line parallel to the drill line. In this way the vision system 811 of the robot can pick up on this line and the robot server will automatically calculate the relative rotation of the drilling apparatus 100 to the drill line. An advantage of this approach is that it can save time since only one reflector prism is needed on the robot. The total station 810 then does not need to measure one prism, then find the next and measure again. It is also quite versatile as the parallel laser line can be moved to be within the viewing area of a vision system 811 of the robot, for example, in those situations where the robot needs to be placed to the side of the drill line to such an extent that the actual drill line would not be visible in the vision system 811.

Thus, a line laser can be placed so that it is exactly parallel to the drill line. The operator could mark out, in advance, a set of points which are parallel to the drill line. These should be placed with such an interval that an operator from any position can find at least two to use for aligning the laser. The alignment of this laser could be done at the same time as the robot is drilling so that it does not introduce any increase in drilling time. A possible downside of this method is that it relies on a human placing the visible laser line, which could lead to inaccurate placement and then inaccurately drilled holes. However, this inaccuracy is local to the current position of the robot and is not accumulated down the drill line.

Another method is to make use of two or three reflector prisms on the robot, for example, placing one of these on each side (left/right) of the robot. The distance from the total station 810 to each prism is used to calculate the rotation of the robot relative to the drill line. An advantage of this method is that human error/inaccuracy may be avoided and all the holes should have a guaranteed accuracy within the limits of the total station 810 measurement system; however, it can be more time-consuming as the total station 810 needs to measure the position of both prisms after the robot has reached its drilling position and is stationary. Although one prism can be measured more or less instantaneously, the total station 810 will need to traverse or slew to the next to make another measurement.

A further method is to utilise a 3-space sensor (e.g., a combination of 3-axis accelerometer, 3-axis gyro, and 3-axis magnetometer, such as in an inertial measurement unit), or higher quality gyro (e.g., a 6 or 9 degree of freedom gyro or IMU), to measure the yaw/rotation of the robot. A parallel line or a dual prism measurement is still needed at the start position to set a reference point for the gyro. With a given, known gyro-/sensor drift and a known accuracy, it is possible to calculate how often the IMU 812 needs to be calibrated.

For certain drilling jobs, such as dropped ceilings, the accuracy of each hole does not require the same precision as, for example, electrical installations, such as fixtures. Consequently, using a measurement process that is too accurate may add unnecessarily to the drilling time, reducing the efficiency of the drilling apparatus 100.

The gyro/IMU 812 can provide data to the robot server 803 instantaneously and so does not create delay between when the drilling apparatus 100 is parked and when drilling can commence.

In these arrangements, a vision system 811 provided on the robot may be used to find and measure the plane of the ceiling relative to the robot. It can also measure the distance between the robot and the ceiling. This additional information can help the robot to know exactly how to move the robotic arm 110, as well as providing an indoor positioning system with millimetre precision for the drilling apparatus 100. The vision system 811 can include a scanner, for example, to identify the position and physical boundaries of components that are already mounted in the ceiling, or even to accommodate ceilings that by design are not flat.

At step 1109, the robot server 803, having had receipt of the file with the drill hole coordinates (CSV file from step 1104), creates a work list of drill holes that the robotic arm can reach from its current position.

The coordinates of the holes (including depth of each hole) to be drilled can now be mapped from the BIM coordinate system to the real-life positions of the laser station coordinates. The position of the drilling apparatus 100 is also known from step 1108. It can be measured easily by having a reflector prism fitted to the base of the robotic arm 110 or some other part of the apparatus with a fixed, known relationship between the position of the prism and the base of the robotic arm.

As part of step 1109, the operator would normally be presented at this stage with the work list, for example, as a display on a screen, and given an opportunity to override or re-order certain drilling actions. Assuming everything is correct in the work list, the robot server executes the work list by causing the robotic arm at step 1110 to drill a set of holes as planned in the BIM file.

Once the set of holes in step 1110 has been drilled and prepared in accordance with the instructions of the BIM file, the drilling apparatus 100 may be repositioned and the process repeated from step 1108. Thus the position of the drilling apparatus 100 is re-measured in step 1108, a new work list is created for the new position in step 1109 and a new set of holes is drilled and prepared in accordance with the BIM file in step 1110.

These steps may be repeated until all the holes in a particular section of a building or in accordance with a particular works schedule have been drilled and prepared in accordance with the instructions of the BIM file.

One problem that has been encountered is how to compensate for sway in the drilling apparatus 100. Any lifting mechanism that the robotic arm 110 is mounted to is likely to experience sway when the centre of gravity of the lifted load shifts, for example, as the robotic arm 110 reaches out for a distant hole. Conventional scissor lifts can suffer from this, particularly as the joints wear, and the amount of sway will increase depending on how high the lift is raised. There may also be some movement in the joints of the robotic arm, though this is likely to be negligible in comparison to the lifting mechanism.

Sway of just a few degrees in the lifting mechanism can displace the position of the drill tip by several millimetres, the drilled hole ending up slightly further away from the intended drill point. Another is that the drill tip engages the ceiling at a steep angle rather than at right angles, and this can create difficulties with the drilling operation through judder and drift of the drill tip. If the sway is significant, then the holes could be widened by such a degree that a fastening plug intended for the bore will not fit tightly, creating a risk that when heavy installations are mounted to the ceiling, the plugs might come loose and the mounted equipment might even fall. On the other hand, if sway can be avoided, it reduces the likelihood of the drill bit jamming and results in cleaner, more circular holes which are true to intended dimensions.

To resolve this sway problem, a 9 degree of freedom or 6 degree of freedom space sensor (this could be the same as that described above for measuring the orientation of the drilling apparatus 100 relative to the reference line) could be mounted on the robot to measure its position before movement and then after, when the robotic arm is extended and before the drilling is commenced, to determine if sway is present and compensate with a displacement and/or rotation of the drill accordingly.

Another method would be to monitor or log data from such a sensor during drilling. This will allow the system to teach itself what normally happens during drilling, in order to customise the amount of compensation to the particular drilling apparatus 100 and forces encountered during drilling. However, tracking the sway/deflection during a drilling operation can be difficult due to restrictions of line of sight between the total station 810 and the prism or between the vision system 811 and the ceiling. Logged data can be used to factor in a compensation for the additional sway/deflection caused by the increased force applied during drilling.

Another method may use the fitting of a prism close to the movable end of the robotic arm so that the exact position of the drill 122 can be determined before drilling is commenced. A feedback system could be used to tell the robot server 803 when displacement of the drill tip caused by the sway has exceeded a particular threshold, and the robot server 803 can then compensate with a suitable displacement or rotation to the drill 120.

Figure 12:
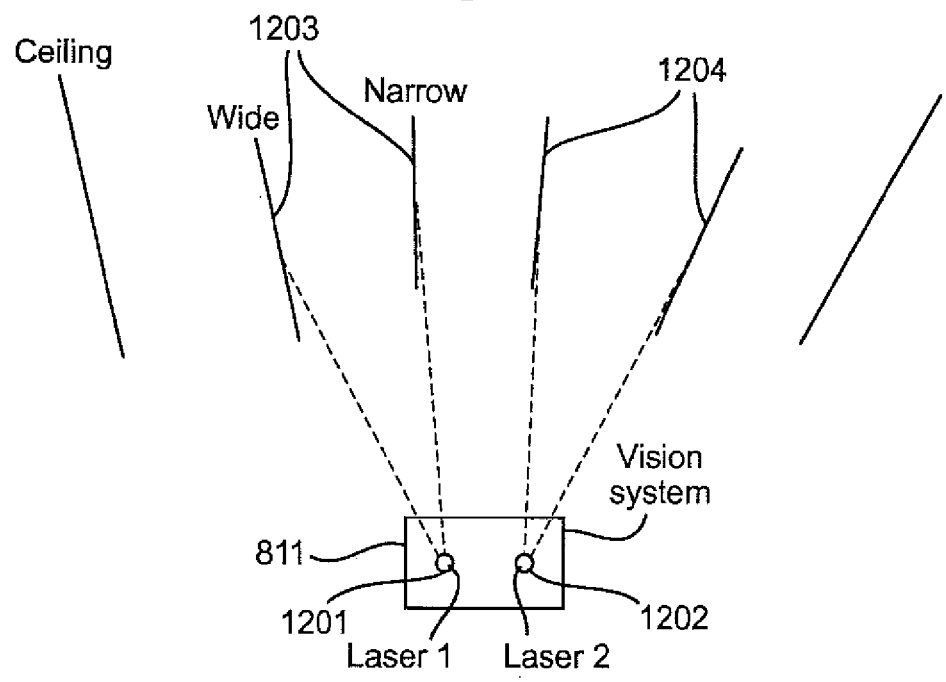
FIG. 12 is a schematic view of servo controlled guide lasers for the drilling apparatus.

FIG. 12 illustrates a set of servo controlled guide lasers that could be used with the drilling apparatus 100.

Guide lasers are used by the vision system 811 to project (two) lines on the ceiling. These are used to calculate certain parameters such as the distance and angle of the ceiling relative to the robot (pitch and roll). Experience from the construction site has shown that having the guide lasers at a set angle can create problems. However, by mounting the guide lasers to servos that are able to be controlled from the robot server 803, these guide lasers can be set to project lines anywhere within the field of view of the robot's vision system cameras. This can be a great help for example, when drilling holes along a beam, particularly a narrow beam, that protrudes down from the main ceiling. Fixed guide lasers are usually too wide to mark such a beam and so the vision system may not see the beam at all, creating a situation where the robot may collide with the beam.

Thus as shown in FIG. 12, the vision system 811 may comprise first and second guide lasers 1201, 1202, laser beams 1203 and 1204 respectively. Each guide laser 1201, 1202 is mounted on a servo to change the angle of the beams between a narrow and a wide setting as shown.

Figure 13:
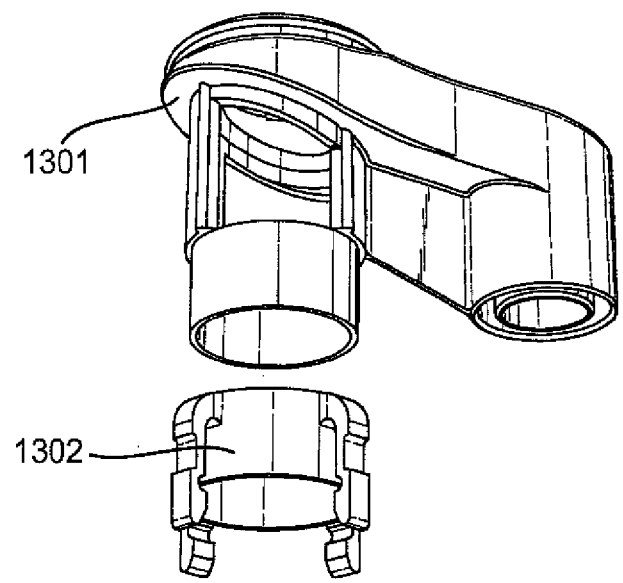
FIG. 13 is a perspective view of an exemplary vacuum attachment arrangement.

FIG. 13 illustrates a perspective view of a vacuum attachment for a drill on the robotic arm. The currently available vacuum attachments connect directly to the drill and they must mate specifically with the shape of the housing of the drill. According to this development, the vacuum collar 1301 can be attached to the robotic arm via a drill clamp. This allows for replacing the drill without having to replace the vacuum collar. It also allows for changing the chuck on a drill from an SDS to a regular chuck without having to replace the collar. It further allows for the vacuum equipment to be moved to one side when drilling against an object or a wall, to allow the drilling operation to proceed without having to reposition the whole of the drilling apparatus 100. The vacuum equipment may comprise a quick release connector 1302 for easy connection and disconnection of the vacuum system.

Figure 14A:
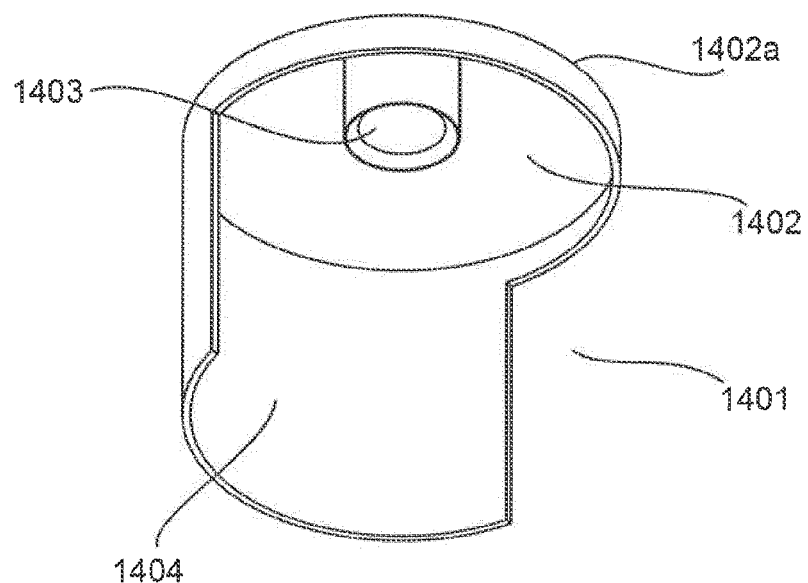
FIGS. 14a and 14b are perspective and side views of a prism cap which can be used on a reflector prism.
Figure 14B:
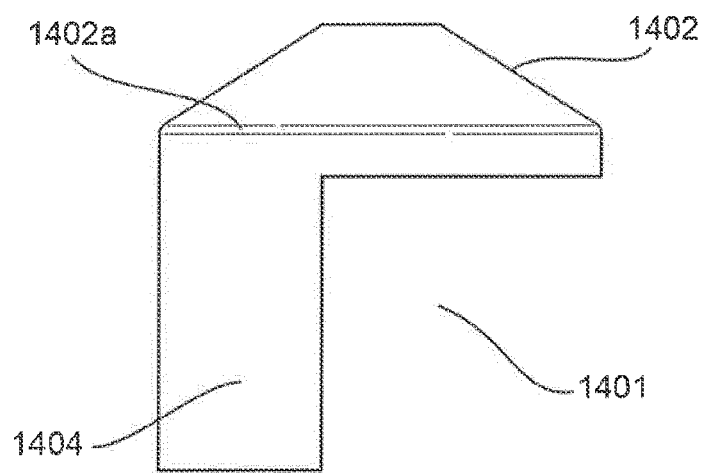

FIG. 14a is a perspective view of an exemplary prism cap 1401 that can be fitted over the top of a prism mounted on the drilling apparatus 100 used with the total station measuring system. FIG. 14b is a side elevation of the prism cap 1401. One problem that has been encountered is that the shape of a standard prism, which often has a top part that protrudes upwards in a threaded spike, can present a nuisance by snagging on passing cables when the robot moves past it on its way back and forth to drill holes. A prism cap 1401 as shown, is able to cover the threaded spike so that cables are less likely to snag.

The prism cap 1401 also performs a further operation. One problem that has been identified is that the total station can easily lock onto the wrong prism when measuring the drill line. When a prism is mounted on the drilling apparatus 100, with the prism cap 1401 in place on top of the prism, the operator can easily turn it around to shield the prism from view of the total station. With the prism out of sight, the total station will then lock onto the correct prism used for marking the drill line.

Thus viewed from one aspect, the prism cap comprises: a top surface 1402 having a perimeter 1402a, a threaded bore 1403 provided under the top surface 1402 configured for mounting to a prism, and a shield portion 1404 extending from the perimeter of the top surface, the shield portion being configured to shield a region under the top surface where a prism would be located, the shield portion extending an angular distance around the perimeter corresponding to between about 90° and 270° of the top surface's perimeter 1402a. Preferably it extends more than 100° and less than 150° (for example, it may extend 120°). The prism cap 1401 may be moulded in plastics or other suitable non-transparent material. Preferably the top surface 1402 is circular and the shield portion 1404 forms part of a cylindrical wall depending from the top surface 1402, but other shapes are equally possible.

We claim:

1. A robotic drilling apparatus which has been adapted for drilling holes in ceilings and walls on a construction site, the apparatus comprising:
    a robotic arm mounted to a substructure, the substructure comprising a lifting mechanism arranged to lift the robotic arm to a working position;
    an internet connection or communication port for accessing and/or retrieving a BIM file,
    wherein the robotic arm has a base end and a movable end, the base end being mounted to an upper surface of the lifting mechanism and the movable end being capable of movement with respect to the base end in a three-dimensional space,
    wherein the robotic drilling apparatus further comprises a mount provided on the movable end for holding a drilling device and a control unit for controlling the operation of the robotic arm;
    wherein the robotic arm includes a plurality of segments configured to pivot and/or rotate with respect to each other to enable the drilling device to be maneuvered about six axes; and
    wherein the control unit is configured to analyze a BIM file and determine a schedule of works for the robotic drilling apparatus, determining an order for drilling the holes prescribed in the BIM file.

2. An apparatus as claimed in claim 1, wherein the control unit is configured to determine an order for a pattern of holes based on hole size.

3. An apparatus as claimed in claim 1, wherein the control unit is configured to determine an order for a pattern of holes based on location and taking into account reach of the robotic arm.

4. An apparatus as claimed in claim 1, wherein the control unit is configured to determine one or more locations for positioning the robotic drilling apparatus in the construction site before a drilling operation is commenced.

5. An apparatus as claimed in claim 1, wherein the control unit comprises a robot server which is configured to determine a finish for the drilled holes.

6. An apparatus as claimed in claim 1, wherein the apparatus further comprises a total laser station.

7. A method of drilling holes in a ceiling or a wall on a construction site comprising:
    providing a robotic drilling apparatus as claimed in claim 1;
    installing instructions in a memory of the control unit for executing a set of drilling operations;
    setting a first location;
    activating a drilling operation stored in the memory to cause the robotic arm to execute a set of controlled movements that maneuver the drilling device and drill a pattern of holes in a ceiling or wall in accordance with the installed instructions.

8. A method as claimed in claim 7, wherein the method includes the step of fitting the robotic arm to an upper surface of a lifting mechanism on a moveable substructure, and raising the robotic arm to a working position prior to drilling a pattern of holes.

9. A method as claimed in claim 8, wherein the step of installing instructions comprises the control unit accessing or retrieving the BIM file.

10. A method as claimed in claim 9, further comprising the control unit analyzing the BIM file and then accessing or downloading a library file to determine hole positions for a component or assembly indicated in the BIM file.

11. A method as claimed in claim 7, wherein the step of installing instructions comprises the control unit accessing or retrieving the BIM file.

12. A method as claimed in claim 11, further comprising the control unit analyzing the BIM file and then accessing or downloading a library file to determine hole positions for a component or assembly indicated in the BIM file.

13. A method as claimed in claim 7, further comprising the control unit analyzing the BIM file and determining a schedule of works for the robotic drilling apparatus, including determining an order for drilling the holes prescribed in the BIM file and preferably further determining a finish for the holes.

14. A method as claimed in claim 13, wherein the control unit determines an order for a pattern of holes based on hole size.

15. A method as claimed in claim 13, wherein the control unit determines an order for a pattern of holes based on location and taking into account reach of the robotic arm.

16. A method as claimed in claim 13, wherein the control unit determines one or more locations for positioning the robotic drilling apparatus in the construction site before a drilling operation is commenced.

17. A method as claimed in claim 7, wherein vibrations are reduced during a drilling operation by creating suction within a shroud on the drilling device.

18. A method as claimed in claim 7, wherein vibrations are reduced during a drilling operation by using a suspension system to allow the drilling device to vibrate independently of the robotic arm.

19. A method as claimed in claim 7, wherein the robotic drilling apparatus comprises an inertial measurement unit (IMU) and the method includes the steps of measuring the position of the robotic arm when extended, calculating a compensation for sway in the lifting mechanism, and adjusting the position or angle of the drill to take account of the calculated compensation.

20. A method of drilling holes in a ceiling or a wall on a construction site comprising:
- providing a robotic arm mounted to a substructure, the substructure comprising a lifting mechanism arranged to lift the robotic arm to a working position;
- installing instructions in a memory of a control unit for controlling the operation of the robotic arm and executing a set of drilling operations;
- setting a first location; and
- activating a drilling operation stored in the memory to cause the robotic arm to execute a set of controlled movements that maneuver the drilling device and drill a pattern of holes in a ceiling or wall in accordance with the installed instructions,
- wherein the robotic arm has a base end and a movable end, the base end being mounted to an upper surface of the lifting mechanism and the movable end being capable of movement with respect to the base end in a three-dimensional space,
- wherein the robotic drilling apparatus further comprises a mount provided on the movable end for holding a drilling device and the control unit;
- wherein the robotic arm includes a plurality of segments configured to pivot and/or rotate with respect to each other to enable the drilling device to be maneuvered about six axes; and
- wherein the apparatus further comprises a total laser station.

* * * * *